(12) United States Patent
Froggatt et al.

(10) Patent No.: US 10,976,155 B2
(45) Date of Patent: Apr. 13, 2021

(54) MICRO OPTIC ASSEMBLIES AND OPTICAL INTERROGATION SYSTEMS

(71) Applicant: INTUITIVE SURGICAL OPERATIONS, INC., Sunnyvale, CA (US)

(72) Inventors: Mark Froggatt, Blacksburg, VA (US); Eric Sanborn, Blacksburg, VA (US); Alexander K. Sang, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 95 days.

(21) Appl. No.: 16/333,752

(22) PCT Filed: Aug. 16, 2017

(86) PCT No.: PCT/US2017/047042
§ 371 (c)(1),
(2) Date: Mar. 15, 2019

(87) PCT Pub. No.: WO2018/063546
PCT Pub. Date: Apr. 5, 2018

(65) Prior Publication Data
US 2019/0249982 A1 Aug. 15, 2019

Related U.S. Application Data

(60) Provisional application No. 62/400,285, filed on Sep. 27, 2016.

(51) Int. Cl.
*G01B 11/16* (2006.01)
*G02B 6/02* (2006.01)
(Continued)

(52) U.S. Cl.
CPC ........ *G01B 11/161* (2013.01); *G01B 9/02049* (2013.01); *G01D 5/35306* (2013.01);
(Continued)

(58) Field of Classification Search
CPC ............ G01D 5/35306; G01B 9/02049; G01B 2290/70; G01B 11/161; G02B 6/2706; G02B 27/283; G02B 27/30
See application file for complete search history.

(56) References Cited

U.S. PATENT DOCUMENTS 4,566,761 A * 1/1986 Carlsen ................. G02B 6/105
359/484.07
5,903,393 A 5/1999 Kalibjian et al.
(Continued)

FOREIGN PATENT DOCUMENTS

EP 1825215 B1 10/2013
WO WO-2011034584 A2 3/2011

OTHER PUBLICATIONS

International Search Report and Written Opinion for Application No. PCT/US2017/047042, dated Nov. 27, 2017, 17 pages.
(Continued)

*Primary Examiner* — Michael A Lyons
(74) *Attorney, Agent, or Firm* — Schwegman Lunberg & Woessner, P.A.

(57) ABSTRACT

Example embodiments include an optical assembly for an optical interrogation system having a single core or a multicore sensing fiber, a measurement fiber to couple light into the sensing fiber, and a reference fiber arranged with the measurement fiber as part of an optical interferometer. A beam splitter combines light from the sensing fiber and with light from the reference fiber. A polarization beam splitting prism separates the combined light into first polarized light and second polarized light that is orthogonal to the first
(Continued)

polarized light. The optical assembly can substantially reduce the size, complexity, or cost associated with the traditional optical components in an optical interrogation system that it replaces. Other example optical assemblies are described. Embodiments describe optical interrogation systems using the example optical assemblies.

26 Claims, 13 Drawing Sheets

(51) Int. Cl.
    *G02B 27/30*     (2006.01)
    *G01B 9/02*     (2006.01)
    *G01D 5/353*     (2006.01)
    *G02B 5/04*     (2006.01)
    *G02B 27/28*     (2006.01)
    *G02B 6/27*     (2006.01)

(52) U.S. Cl.
    CPC .............. *G02B 5/04* (2013.01); *G02B 6/02* (2013.01); *G02B 27/283* (2013.01); *G02B 27/30* (2013.01); *G01B 2290/70* (2013.01); *G02B 6/2706* (2013.01); *G02B 6/2773* (2013.01)

(56) References Cited

U.S. PATENT DOCUMENTS

| | | | |
|---|---|---|---|
| 6,876,451 B1* | 4/2005 | Carlson | G03F 7/70775 356/492 |
| 7,116,479 B1 | 10/2006 | Jacobson et al. | |
| 7,538,883 B2* | 5/2009 | Froggatt | G01D 5/3538 356/477 |
| 7,772,541 B2 | 8/2010 | Froggatt et al. | |
| 7,781,724 B2 | 8/2010 | Childers et al. | |
| 8,400,620 B2 | 3/2013 | Froggatt et al. | |
| 8,531,655 B2 | 9/2013 | Klein et al. | |
| 8,773,650 B2 | 7/2014 | Froggatt et al. | |
| 2006/0013523 A1 | 1/2006 | Childers et al. | |
| 2008/0013183 A1* | 1/2008 | Takeuchi | G02B 3/0043 359/626 |
| 2011/0243574 A1 | 10/2011 | Essiambre et al. | |
| 2014/0176937 A1 | 6/2014 | Liu et al. | |
| 2014/0376001 A1* | 12/2014 | Swanson | G01B 9/02004 356/479 |
| 2015/0263804 A1 | 9/2015 | Horikx et al. | |
| 2016/0102999 A1 | 4/2016 | Liesener | |
| 2016/0258839 A1 | 9/2016 | Froggatt et al. | |
| 2016/0305984 A1* | 10/2016 | Bohnert | G01R 15/247 |

OTHER PUBLICATIONS

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.
Extended European Search Report for Application No. EP17856999.2, dated Apr. 20, 2020, 8 pages.

* cited by examiner

FIG. 1

MICRO OPTIC ASSEMBLIES AND OPTICAL INTERROGATION SYSTEMS

This application is the U.S. national phase of International Application No. PCT/US2017/047042 filed 16 Aug. 2017, which designated the U.S. and claims the benefit of U.S. Provisional Patent Application 62/400,285, filed Sep. 27, 2016, entitled "MICRO-OPTIC ASSEMBLIES AND OPTICAL INTERROGATION SYSTEMS," the entire contents of each of which are incorporated herein by reference.

TECHNICAL FIELD

The technology described in this application relates to optical interrogation system measurements used for fiber optic shape and other sensing applications and to micro optic assemblies and optical interrogation systems that use the micro optic assemblies.

INTRODUCTION

Optical strain sensing is a technology useful for measuring physical deformation of a waveguide caused by, for example, the change in tension, compression, or temperature of an optical fiber. A multi-core optical fiber is composed of several independent waveguides embedded within a single fiber. A continuous measure of strain along the length of a core can be derived by interpreting the optical response of the core using swept wavelength interferometry typically in the form of Optical Frequency Domain Reflectometry (OFDR) measurements. With knowledge of the relative positions of the cores along the length of the fiber, these independent strain signals may be combined to gain a measure of the strain profile applied to the multi-core optical fiber. The strain profile of the fiber refers to the measure of applied bend strain, twist strain, and/or axial strain along the length of the fiber at a high (e.g., less than 50 micrometers) sample resolution.

Previous patents have described OFDR-based shape sensing with multi-core optical fibers (e.g., see U.S. Pat. Nos. 7,781,724 and 8,773,650 incorporated by reference). Some applications for OFDR-based shape sensing fiber require a high degree of confidence in terms of the accuracy and reliability of the shape sensing output. A non-limiting example application is robotic arms used in surgical or other environments.

OFDR systems are typically constructed using discrete optical fiber components such as optical couplers, polarizing beam splitters, polarization controllers, optical connectors, fanout assemblies, etc. OFDR systems become more complex, costly, and require more space as the number of cores increases because another set of discrete optical fiber components must be provided for each additional core. The inventors realized that these problems could be ameliorated if the functions performed by these discrete optical fiber components could be performed using a shared optical assembly. Various example embodiments of shared optical assemblies are described below.

SUMMARY

Example embodiments include an optical assembly for an optical interrogation system that includes a sensing fiber, a measurement fiber to couple light into the sensing fiber, and a reference fiber arranged with the measurement fiber as part of an optical interferometer. A beam splitter combines light from the sensing fiber (such as light reflected from the sensing fiber) and light from the reference fiber into combined light, and a polarization beam splitting prism separates the combined light into first polarized light and second polarized light. The second polarized light is orthogonal to the first polarized light.

In example applications, the sensing fiber may be a single core fiber or a multicore sensing fiber. For example, the measurement fiber may be a single mode, single core measurement fiber and the reference fiber may be a single mode, single core reference fiber. An example multicore sensing fiber may include three or more cores. An application provides a multicore sensing fiber with six cores.

The optical assembly may include a first collimator to collimate light from the sensing fiber, a second collimator to collimate light from the measurement fiber, a third collimator to collimate light from the reference fiber, and a de-collimator to de-collimate the first and second polarized light. Each of the second and third collimators, in an example application, has a focal length greater than a focal length of the first collimator.

The optical assembly in example applications includes one or more first polarized light detecting fibers for detecting the first polarized light, and one or more second polarized light detecting fibers for detecting the second polarized light. The optical assembly may also include a first lens array with individual lenses to focus light from the single mode, single core measurement fiber to a corresponding core in the sensing fiber, and a second lens array with individual lenses to focus light from the single mode, single core reference fiber to a corresponding core in the sensing fiber. If the sensing fiber is a multicore sensing fiber, the assembly may further include (i) a first plurality of light detecting fibers to detect the first polarized light, the first plurality of light detecting fibers having a first plurality of single mode, single core, light detecting fibers, wherein the first plurality of light detecting fibers corresponds to a first plurality of cores in the multicore sensing fiber, and (ii) a second plurality of light detecting fibers to detect the second polarized light, the second plurality of light detecting fibers comprising a second plurality of single mode, single core, light detecting fibers, wherein the second plurality of light detecting fibers corresponds to a second plurality of cores in the multicore sensing fiber.

Example embodiments include an optical measurement system for measuring an optical sensing fiber comprising multiple cores, where the measurement system includes a tunable laser configured to sweep laser light over a first measurement range of wavelengths and an optical network to provide the laser light swept by the tunable laser to the optical sensing fiber and to output reflected light from the optical sensing fiber associated with each of the multiple cores. Detection circuitry detects the output reflected light from the optical sensing fiber and converts the output reflected light from the optical sensing fiber into corresponding electrical signals, and data processing circuitry processes the electrical signals. The optical network includes a measurement fiber to couple light into the optical sensing fiber, a reference fiber arranged with the measurement fiber as part of an optical interferometer, a shared beam splitter shared by the multiple cores of the optical sensing fiber to produce combined light, the combined light combining light from the optical sensing fiber (such as reflected from the optical sensing fiber) and light from the reference fiber, and a shared polarization beam splitting prism shared by the multiple cores of the optical sensing fiber to separate the combined light into first polarized light and second polarized light, the second polarized light being orthogonal to the first polarized light. One or more first polarized light detecting fibers detects the first polarized light coupled to the detection circuitry, and one or more second polarized light detecting fibers detects the second polarized light coupled to the detection circuitry.

In example applications, the optical network further includes a first collimator to collimate light from the optical sensing fiber, a second collimator to collimate light from the measurement fiber, a third collimator to collimate light from the reference fiber, and a de-collimator to de-collimate the first and second polarized light from the polarization beam splitting prism. A first lens array with individual lenses focuses light from the single mode, single core measurement fiber to a corresponding core in the optical sensing fiber, and a second lens array with individual lenses focuses light from the single mode, single core reference fiber to a corresponding core in the optical sensing fiber.

In example applications, the measurement system further comprises a first plurality of light detecting fibers to detect the first polarized light and a second plurality of light detecting fibers to detect the second polarized light. The first plurality of light detecting fibers comprises a first plurality of single mode, single core, light detecting fibers. The first plurality of light detecting fibers corresponds to a first plurality of cores of the multiple cores of the optical sensing fiber. The second plurality of light detecting fibers comprises a second plurality of single mode, single core, light detecting fibers. The second plurality of light detecting fibers corresponds to a second plurality of cores of the multiple cores of the optical sensing fiber.

Example embodiments include an optical assembly for an optical interrogation system that includes an optical sensing fiber and an input fiber. The optical sensing fiber may have a single optical core or multiple optical cores. A first beam splitter divides light from the input fiber into a measurement light beam and a reference light beam, and a polarization modulator modulates a polarization of the measurement light beam. A second beam splitter couples a portion of the measurement light beam into the optical sensing fiber, and a third beam splitter provides combined light combining light from the optical sensing fiber (such as light reflected from the optical sensing fiber) with the reference light beam. A polarization beam splitting prism separates the combined light into first polarized light and second polarized light that is orthogonal to the first polarized light.

In example applications, a lens array transforms light from a polarization maintaining (PM) input fiber into light from multiple sources, and a first collimating lens directs the light from multiple sources to the first beam splitter. The first beam splitter may be part of a partially-mirrored prism, where the partially-mirrored prism includes a reflector for reflecting the measurement light beam from the first beam splitter into the polarization modulator. The polarization modulator may include a polarization modulating prism and associated electrodes, and the associated electrodes, when activated by a control signal, modulate a polarization of the measurement light beam. The measurement light beam modulated by the polarization modulating prism is reflected by the second beam splitter into the optical sensing fiber, and light reflected from the optical sensing fiber is re-collimated by a second collimating lens having a shorter focal length than the first collimating lens. A portion of the light re-collimated by the second collimating lens is directed by the third beam splitter to the polarization beam splitting prism.

Additional example features for the optical assembly include a first bundle of first polarized light detecting fibers for detecting the first polarized light and a second bundle of second polarized light detecting fibers for detecting the second polarized light. Also, the polarization modulator may include a Faraday Crystal or a Pockels Crystal.

Example embodiments include an optical assembly for an optical interrogation system with a first multicore sensing fiber, a second multicore sensing fiber, and an input fiber. A first beam splitter divides light from the input fiber into a measurement beam and a reference beam, and a polarization modulator modulates a polarization of the measurement beam. A steerable mirror controllably steers a portion of modulated measurement light beam to a selected multicore sensing fiber. The selected multicore sensing fiber is selected from the group consisting of: the first multicore sensing fiber and the second multicore sensing fiber; thus, the selected multicore sensing fiber comprises the first multicore sensing fiber or the second multicore sensing fiber. A second beam splitter splits the portion of the modulated measurement light beam from the selected multicore sensing fiber. A third beam splitter provides combined light combining light reflected from the selected multicore sensing fiber with the reference light beam. A first polarization beam splitting prism separates the combined light into first polarized light and second polarized light that is orthogonal to the first polarized light.

In example applications, the optical assembly may receive a control signal, and based on that control signal, adjust a location of a focus of the measurement beam by steering the steerable mirror. Based on a received control signal, the optical assembly may also adjust for changes or errors in a position of the selected multicore sensing fiber.

Example embodiments include an optical assembly for an optical interrogation system having a first optical sensing fiber, a second optical sensing fiber, and a input fiber. A first beam splitter divides light from the input fiber into a measurement beam and a reference beam, and a polarization modulator modulates a polarization of the measurement beam. A second beam splitter couples a portion of the measurement beam modulated by the polarization modulator into the first optical sensing fiber or the second optical sensing fiber, and a third beam splitter provides combined light combining light reflected from the first optical sensing fiber or the second optical sensing fiber with the reference light beam. A first polarization beam splitting prism separates the combined light associated with the first optical sensing fiber and the reference beam into first polarized light and second polarized light. The second polarized light is orthogonal to the first polarized light. A second polarization beam splitting prism separates the combined light associated with the second optical sensing fiber and the reference beam into the first polarized light and the second polarized light.

In example applications, the optical assembly may have a first bundle of first polarized light detecting fibers for detecting the first polarized light associated with the first optical sensing fiber, a second bundle of second polarized light detecting fibers for detecting the second polarized light associated with the first optical sensing fiber, a third bundle of first polarized light detecting fibers for detecting the first polarized light associated with the second optical sensing fiber, and a fourth bundle of second polarized light detecting fibers for detecting the second polarized light associated with the second optical sensing fiber. The first and second bundles receive primary output signals associated with the first and second optical sensing fibers, and the third and fourth bundles receive complementary, differential output signals associated with the first and second optical sensing fibers as compared to the primary output signals. The optical assembly then may use a difference between the primary output signals and the complementary output signals to provide increased output signal-to-noise ratio.

BRIEF DESCRIPTION OF THE FIGURES

FIG. 1 shows an example OFDR measurement system in accordance with example embodiments.

DETAILED DESCRIPTION

Figure 2A:
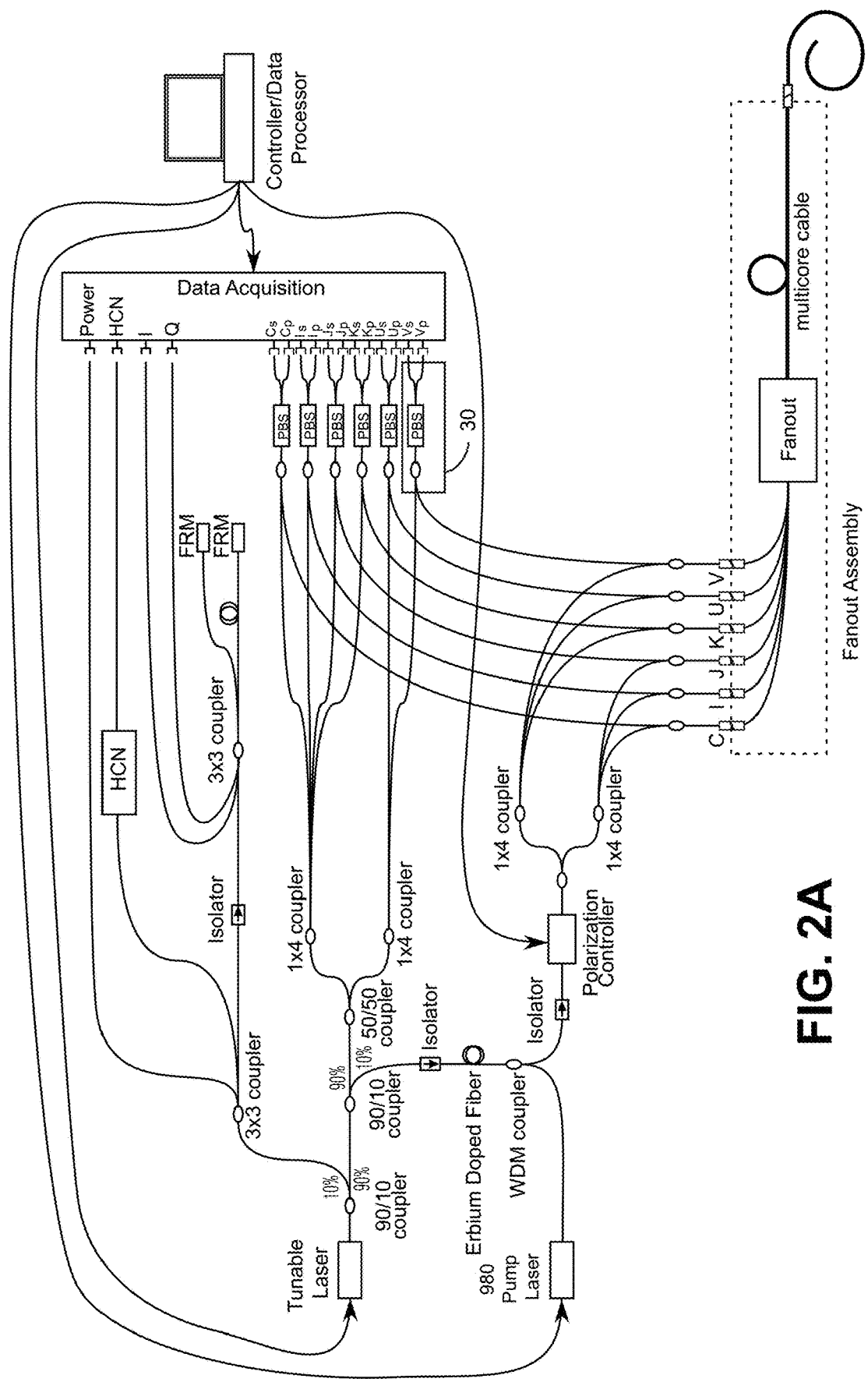
FIG. 2A highlights example discrete optical components for one fiber core channel in FIG. 1.

The following description sets forth specific details, such as particular embodiments for purposes of explanation and not limitation. But it will be appreciated by one skilled in the art that other embodiments may be employed apart from these specific details. In some instances, detailed descriptions of well-known methods, interfaces, circuits, components, and devices are omitted so as not to obscure the description with unnecessary detail. It will be appreciated by those skilled in the art that diagrams herein can represent conceptual views of illustrative circuitry, components, or other functional units.

Figure 1:
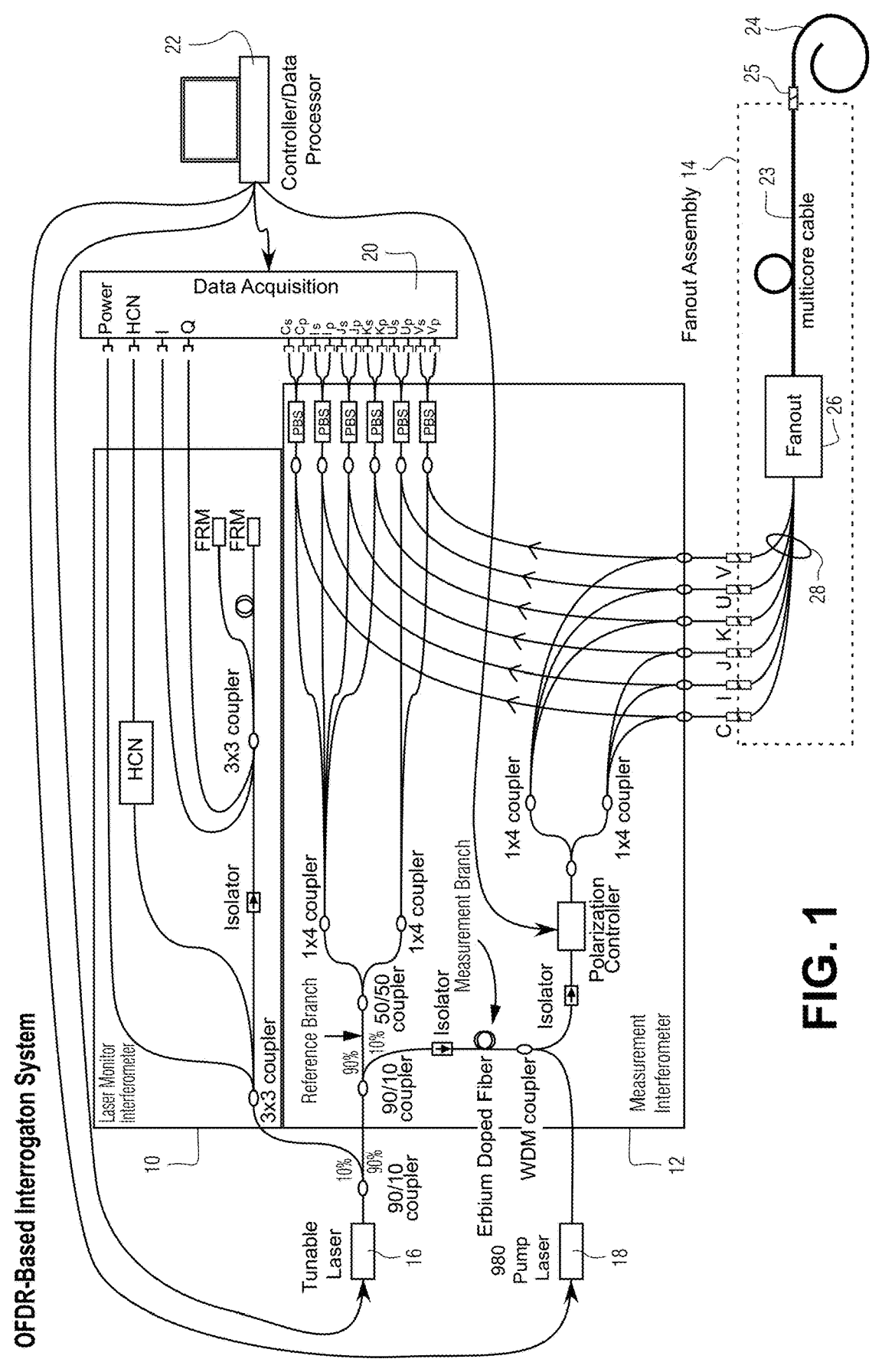

FIG. 1 shows an example embodiment of an OFDR-based interrogation system for an example 6-core sensing fiber. Those skilled in the art will appreciate that an OFDR-based interrogation system may be used with a single mode, single core sensing fiber or with a sensing fiber with more or fewer cores than 6 cores. Individual blocks shown correspond to various nodes. Those skilled in the art will appreciate that the functions of some of the blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions. The functions of the various illustrated elements may be provided through the use of hardware such as hardware circuitry components and/or hardware circuitry capable of executing software in the form of coded instructions stored on computer-readable medium. Thus, such functions and illustrated functional blocks are to be understood as being either hardware-implemented and/or computer-implemented, and thus, machine-implemented. The term "processor" or "controller" also refers to other hardware capable of performing such functions and/or executing software, such as the example hardware recited above.

Light from a frequency tunable laser 16, controlled in this example by the data processor (also "processor" or "controller") 22 rather than by the data acquisition electronics 20, is split with 90/10 coupler between a laser monitor interferometer 10 and a measurement interferometer 12. In the laser monitor interferometer 10, the light is spilt into three paths using a 3×3 coupler. The first path goes to a detector to monitor laser power. The second path passes through a hydrogen cyanide (HCN) gas cell to a detector to provide an absolute wavelength reference. The final path goes through an isolator and another 3×3 coupler to two Faraday rotator mirrors (FRM) with one leg having a known delay difference from the other. The return signals from this interferometer form I/Q signals. With a phase offset of 120 degrees, the I/Q signals are converted to quadrature signals and used to measure the change in optical frequency as the laser sweeps.

The light going into the measurement interferometer 12 is split using a 90/10 coupler between a reference branch and measurement branch of the interferometer 12. The light in the reference branch is split into six reference signals using cascaded couplers. The light in the measurement branch passes through an isolator and then through a length of erbium-doped fiber. This fiber is pumped with light from a 980 nm pump laser 18, controlled in this example by the processor 22 rather than by the data acquisition electronics 20, that couples in through a Wavelength Division Multiplexed (WDM) coupler. This combination of erbium-doped fiber and pump laser 18 amplifies the light in the measurement branch of the interferometer. The light passes through another isolator and then through a polarization controller set to flip the light between two orthogonal (or nearly orthogonal) polarization states on subsequent scans. The light is then split with cascading couplers into six measurement channels. The returning light is combined with the six reference paths using 2×2 couplers. These combined signals then pass through polarization beam splitters (PBSs) to two detectors (S and P) for each channel (C, I, J, K, U, V) input to the data acquisition electronics 20, forming a polarization diverse detection scheme. This creates an interferometric measurement of the light reflected from up to six cores of a multicore fiber. The six channels (C, I, J, K, U, V) are connected to each core of a multicore fiber sensor 24 using a fanout assembly 14 that couples six single core fibers 28 to six cores in a multicore cable 23 connected by a connector 25 to the multicore fiber sensor 24. The controller/data processor 22 controls the tunable laser 16, the polarization controller, and the polarization beam splitters, and also drives the pump laser 18. The data processor 22 also acquires and processes the data from each of the photodiode detectors provided from the data acquisition electronics 20.

The recorded data is the reflected amplitude as a function of optical frequency for two polarization states, S and P, for each fiber optic core measured. The controller/data processor 22 linearizes this recorded data with respect to optical frequency using the data from the laser monitor interferometer 10 so that it is represented in equal increments of optical frequency. The linearized data is Fourier transformed into the time domain to represent the amplitude and phase of the reflected light as a function of optical delay along each fiber core. The S and P data from two sequential orthogonal polarization scans are combined to compensate for birefringence in the fiber cores and form a scalar measure of the amplitude and phase of the reflected light from each core. This combined complex signal (amplitude and phase) is compared with interferometric data recorded in a reference scan, and the resulting phase difference/change for each core is the measured signal that is used to compute the current shape of the fiber. The derivatives of the measured phase changes are proportional to the strains in each core. The bends in the x and y directions, the twist, the strain, and the temperature in the fiber may be determined from the derivatives of the measured phase changes. The details of how these parameters are determined is described in other applications and patents assigned to the current assignee of this application such as U.S. Pat. Nos. 7,781,724 and 8,773,650 identified in the introduction.

Figure 2B:
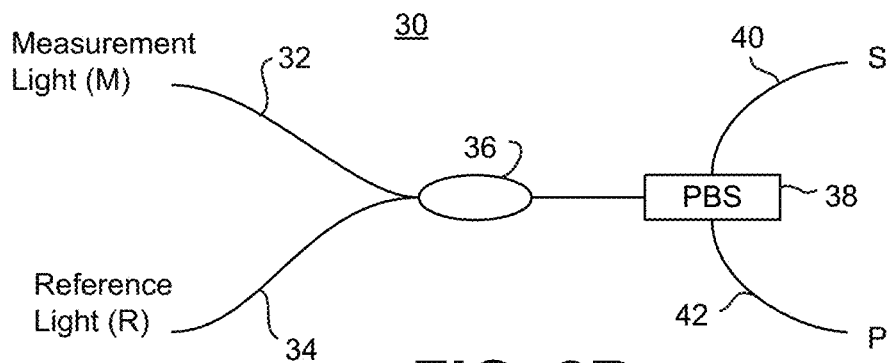
FIG. 2B shows in greater detail the example discrete optical components for one fiber core channel highlighted in FIG. 2A.

FIG. 2A highlights in block 30 example discrete optical components for one fiber core channel in FIG. 1. FIG. 2B shows in greater detail the example discrete optical components for one fiber core channel highlighted in FIG. 2A. This block 30 from the network uses an optical coupler 36 to combine measurement light (M) from fiber 32 and reference light (R) from fiber 34 from one of the six measurement interferometers 12 of FIG. 1 along with a polarization beam splitter (PBS) 38 to split the combined light into two orthogonal linear states detectable by S polarization detecting fiber 40 and P polarization detecting fiber 42.

Figure 3:
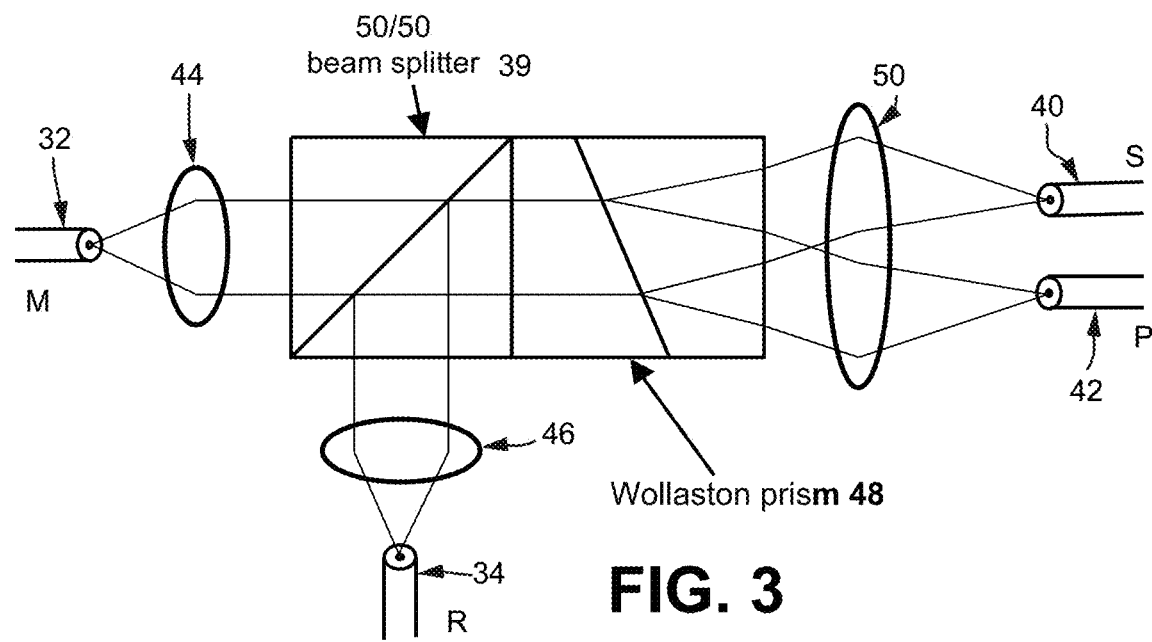
FIG. 3 shows an example optical assembly that replaces the example discrete optical components shown in FIG. 2B with a recombination network implemented with bulk optics to form a bulk optic interferometer.

FIG. 3 shows an example optical assembly that replaces the example discrete optical components shown in FIG. 2B with a recombination network implemented with bulk optics to form a bulk optic interferometer. The measurement light is provided by a fiber 32 that is, in this embodiment, a single mode, single core optical fiber, and is collimated by a collimating lens 44. The reference light is provided by a fiber 34 that is, in this embodiment, a single mode, single core optical fiber and is collimated by a collimating lens 46. The collimated measurement and reference light is combined by a 50/50 cube beam splitter 39 (which essentially replaces the optical coupler 36) and the combined light is then refracted by a shared polarization beam splitting prism (which replaces the PBS 38 in various embodiments) to separate the combined measurement light and reference light into first polarized light and second polarized light that is orthogonal to the first polarized light detected by an S polarization detecting fiber 40 that is a single mode, single core, and an orthogonal P polarization detecting fiber 42 that is a single mode, single core. Although a 50/50 cube beam splitter is shown, other optical components may be used to perform the combining operation such as a pellicle beam splitter, or a "swiss cheese" splitter where 100% (or close to 100%) reflection areas alternate with 100% transmissive (or close to 100% transmissive) surface areas. One example shared polarization beam splitting prism is a Wollaston prism 48 as shown in the Figures, but, other optical components may be used to perform the shared polarization beam splitting operation such as a Nicol prism, a Glan-Taylor prism, a Rochon prism, a Senarmont prism, or a Nomarski prism.

Figure 4:
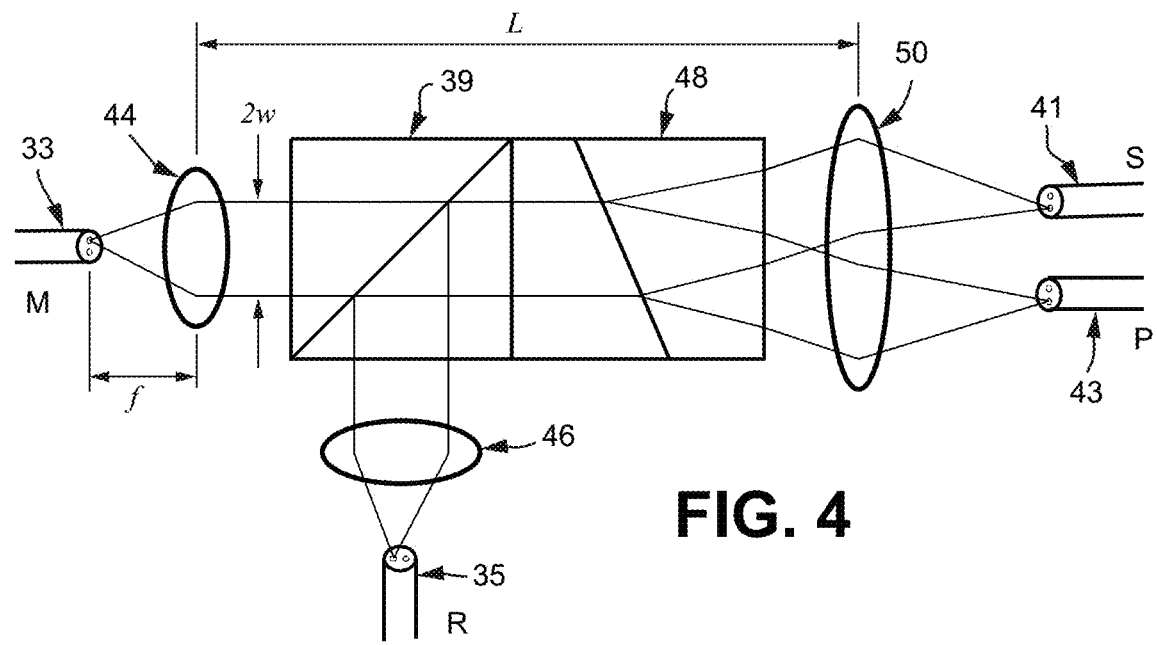
FIG. 4 shows an example bulk optic interferometer similar to that in FIG. 3 but with the single mode, single core fibers replaced by multicore fibers.

FIG. 4 shows an example bulk optic interferometer similar to that in FIG. 3 but with the single mode, single core fibers replaced by multicore fibers including multicore measurement fiber M 33, multicore reference fiber R 35, multicore S polarization detecting fiber 41, and multicore orthogonal P polarization detecting fiber 43. For simplicity, FIG. 4 and many of the other figures show only two cores for each of the detecting fibers 41 and 43, those skilled in the art appreciate that more cores may be used in practice. For example, in cases where the multicore S polarization detecting fiber 41, and multicore orthogonal P polarization detecting fiber 43 are parts of a shape sensing system, example embodiments of shape sensing fibers may have three or more cores. Also for simplicity, only one core's light rays are shown for each of the detecting fibers 41 and 43, and in practice other cores of these detecting fibers 41 and 43 will also have light rays. The letter f is the focal length of the collimating lens 44, and 2w is the width of the collimated beam, with w being the radius of the collimated beam. L is the propagation of the collimated beam.

Figure 5:
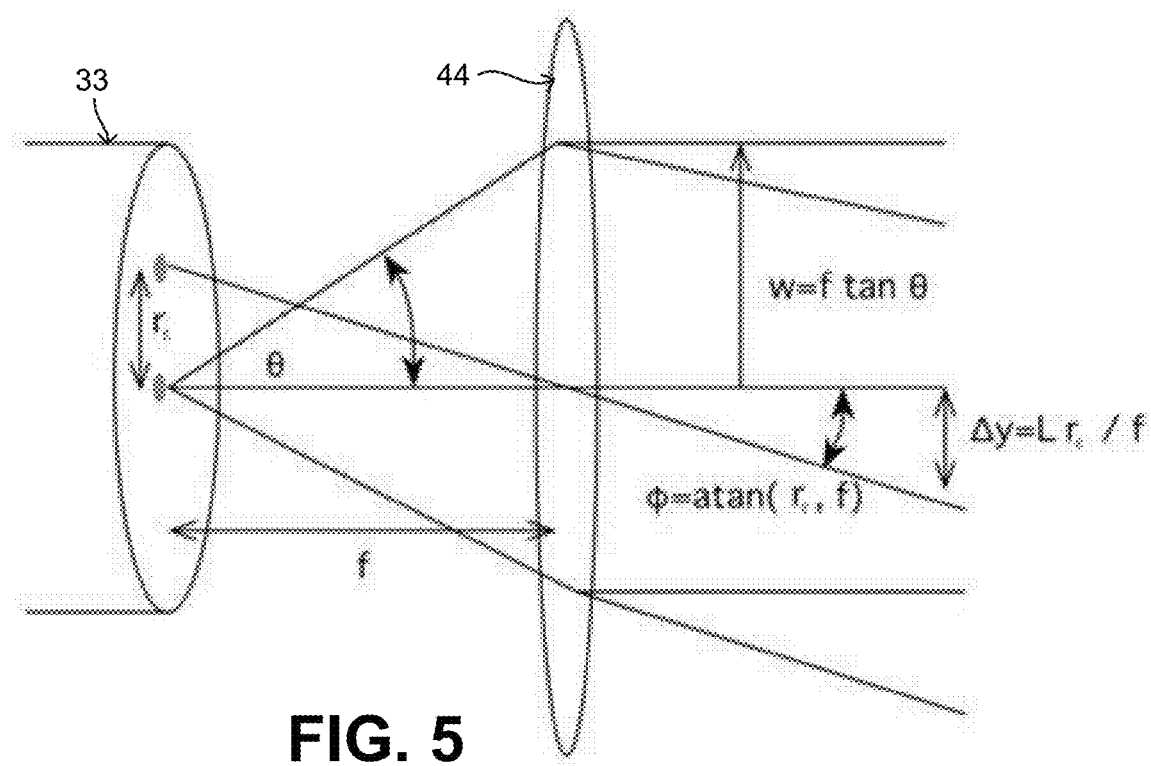
FIG. 5 gives a detailed view of the geometry of the collimating section of the bulk optic interferometer shown in FIG. 4.

FIG. 5 gives a detailed view of the geometry of the collimating section of the bulk optic interferometer shown in FIG. 4. The multicore measurement fiber 33 includes a center core and an offset core separated by a radius $r_c$. The divergence angle θ of the light exiting the center core permits calculation of the beam radius w=f tan θ. The angle φ represents the difference between the propagation angle of the collimated beam from an outer core and the propagation angle (here assumed to be zero) of the collimated beam from the central core and is determined by the equation φ=arctan ($r_c$, f). The beam displacement, Δy, due to the angle displacement of the off-center core is determined using Δy=L $r_c$/f.

Figure 6:
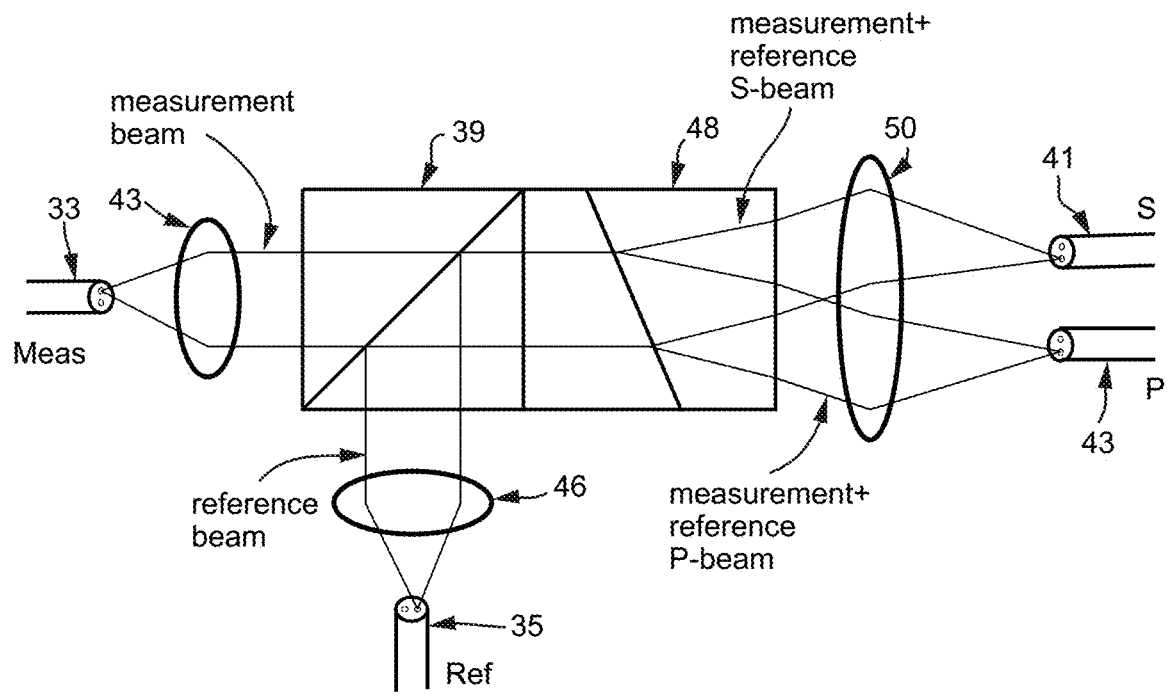
FIG. 6 shows an example bulk optic interferometer with one set of light beams propagating through an example bulk optic interferometer.

FIG. 6 shows an example bulk optic interferometer with one set of light beams propagating through an example bulk optic interferometer. Both the measurement and reference beams are shown, the prism 48 outputs include a measurement+reference s polarization beam and a measurement+reference p polarization beam.

Figure 7:
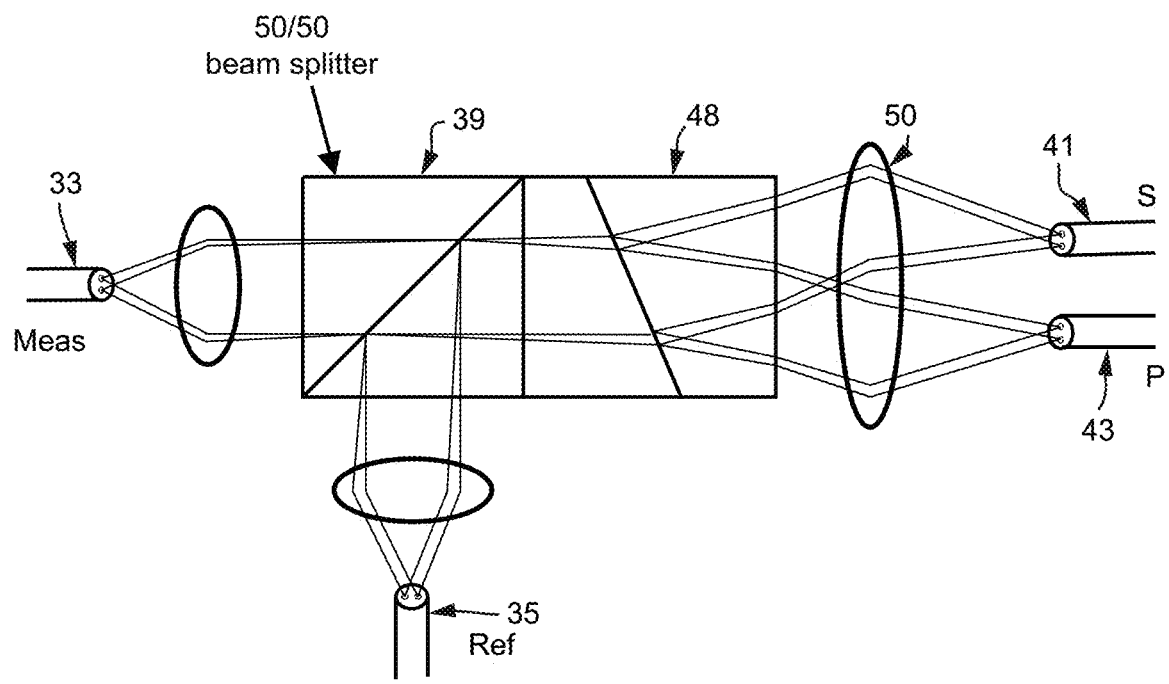
FIG. 7 shows an example bulk optic interferometer with multiple sets of light beams propagating through an example bulk optic interferometer.

FIG. 7 shows the same example bulk optic interferometer as in FIG. 6 but with multiple sets of light beams propagating through an example bulk optic interferometer.

The inventors determined example but non-limiting values for the variables above to demonstrate that the example bulk optic interferometer may be used in place of the optical components shown in block 30 of FIG. 2B. The Rayleigh Range $z_r$ is a measure of how far the collimated beam can propagate without substantial divergence, and it is given by:

$$z_r = \frac{\pi w_0^2}{\lambda}.$$

Starting with an example assumption that the light beam remains collimated for L=20 mm and the Rayleigh range $z_r$ is 40 mm, and substituting in this value and a λ of 1550×10⁻⁹ results in:

$$0.04\ m = \frac{\pi w_0^2}{1550 \times 10^{-9}}$$

which reduces to a beam radius w of 140 microns. The beam diameter 2w may be rounded up to 300 microns with the propagation range of 20 mm. The focal length f of the collimating lens from the multicore fibers is determined using the desired beam radius w and the divergence angle θ of the light exiting the core: w=f tan θ. The divergence angle, θ can be calculated from the numerical aperture NA of the fiber core, which for example is chosen as 0.20 for the NA in air. Recall that beam displacement, Δy, due to the angle displacement of the off-center core is Δy=L $r_c$/f. Setting the beam displacement to be some fraction of the beam diameter, the beam displacement is set to 10% of the beam diameter, or 20% of the beam radius, w:

$$\frac{\Delta y}{w} = \frac{L r_c}{f^2 \tan \theta} = 0.2$$

Solving for the focal length, f:

$$f = \sqrt{\frac{w}{\Delta y} \frac{L r_c}{\tan \theta}} = \sqrt{5 \frac{L r_c}{0.20}} = \sqrt{33 L r_c}$$

and assuming a 6 mm propagation distance and a 35 micron core displacement, results in a focal length of 2.3 mm:

$$f = \sqrt{25(6 \times 10^{-3} m)(35 \times 10^{-6} m)} = 2.3\ mm$$

and a beam radius of:

w=f tan θ=2.3 mm·0.2=0.46 mm or a beam diameter of D=0.9 mm. Using the Lens Makers Equation:

$$\frac{1}{f} = \frac{(n-1)}{R}$$

the radius of the convex lens required to give the desired focal length is estimated as follows:

$$\frac{1}{2.3} = \frac{(1.5-1)}{R}$$
$$R = 2.3(1.5-1) = 1.1\ mm$$

This convex lens radius R value of 1·1 mm is a reasonable, non-limiting, and example value for a practical example design of a shared bulk optics interrogator.

Figure 8:
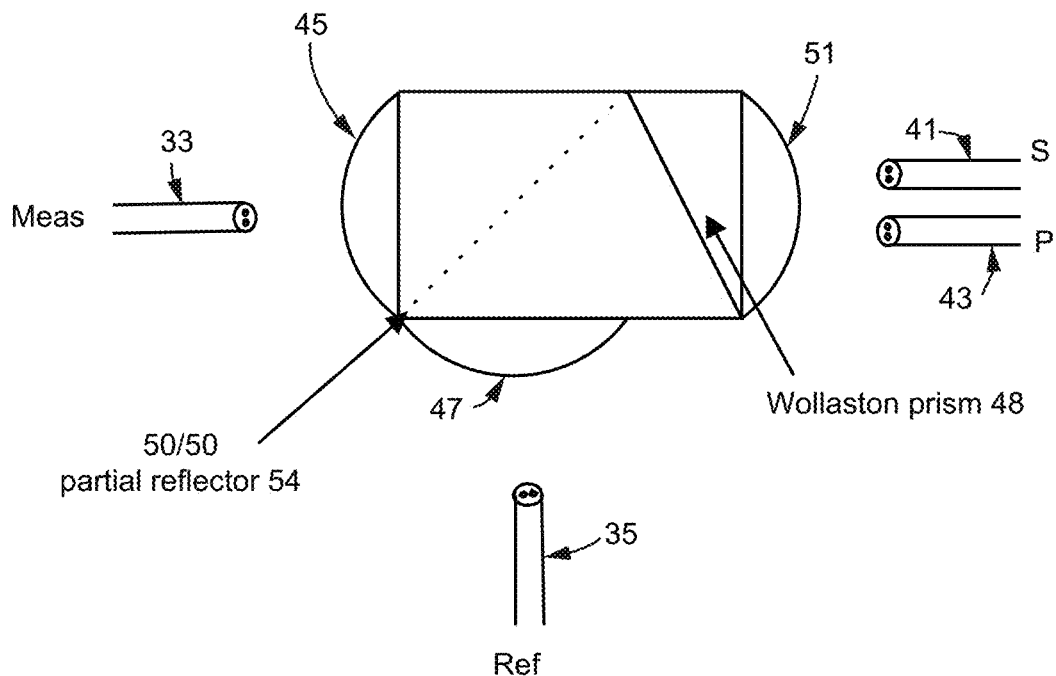
FIG. 8 shows an example bulk optic interferometer with the collimating lenses in contact with the beam splitter/prism.

FIG. 8 shows an example bulk optic interferometer with the collimating lenses in contact with the beam splitter/prism. The 50/50 cube beam splitter is shown now as a partial (50/50) reflector 54, and the prism 48 as a triangle as indicated. Plano-convex collimating lenses 45, 47, and 51 are bonded in this example embodiment on their planar surfaces to obtain a monolithic optical assembly as shown that functions in the same way as the optical assembly shown in FIG. 7 but is more compact.

Figure 9:
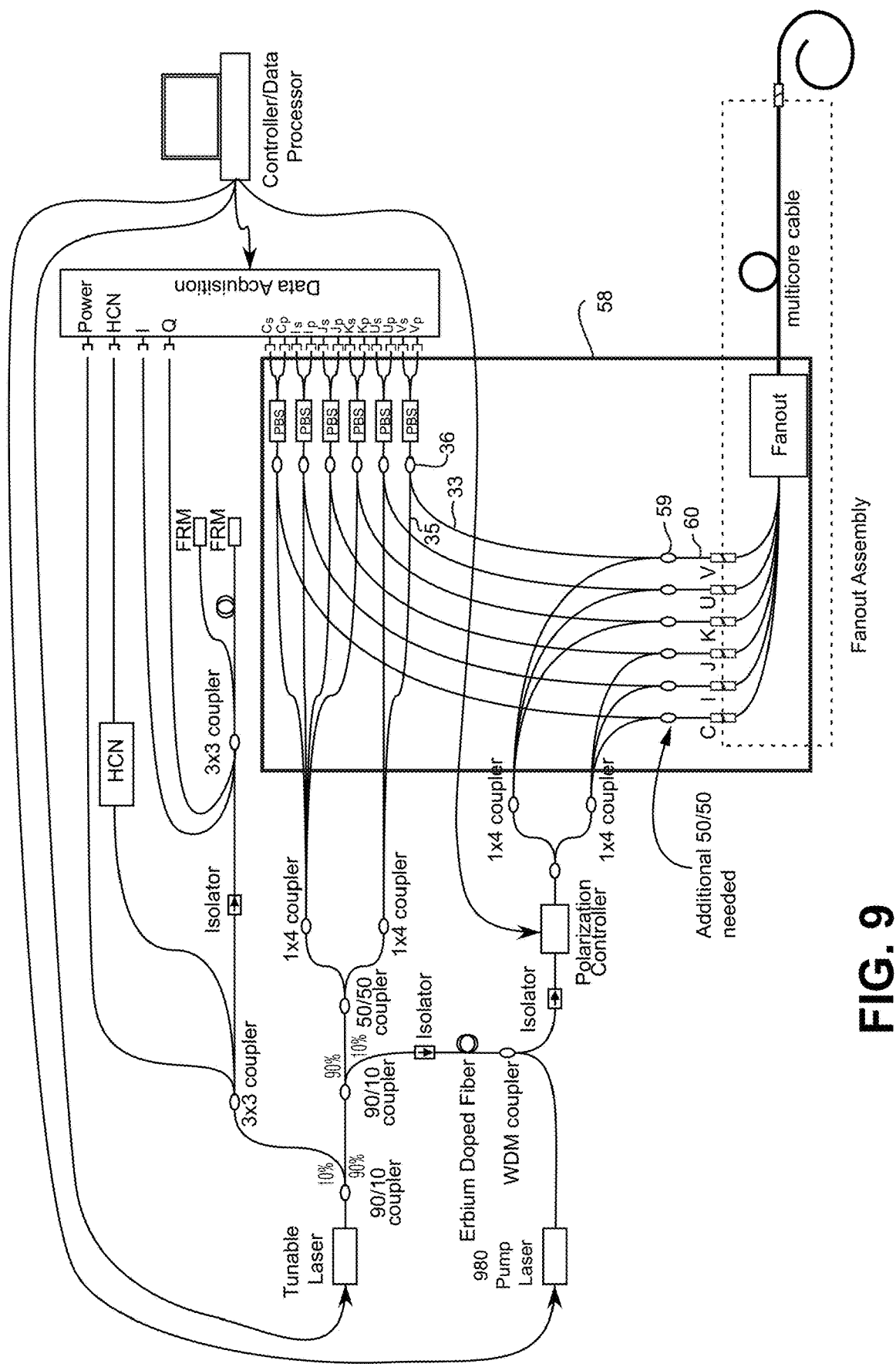
FIG. 9 highlights even more example discrete optical components from FIG. 1 to be consolidated into a shared recombination network implemented with bulk optics.

FIG. 9 highlights at block 58 even more discrete optical components from FIG. 1 to be consolidated into a shared recombination network implemented with bulk optics. In addition to the six coupler-PBS pairs, block 58 includes six coupler-connector pairs plus a fanout assembly that connects to a six core sensing fiber. For reference, one of the channels is labeled including coupler 36, reference fiber 35, measurement fiber 33, coupler 59, and sensing fiber (also "sensor fiber") 60. Those skilled in the art will appreciate that an OFDR-based interrogation system may be used with a single mode, single core sensing fiber that uses just the single labeled channel or with a sensing fiber with any number of cores, such as 6 cores or more or fewer cores than 6 cores.

Figure 10:
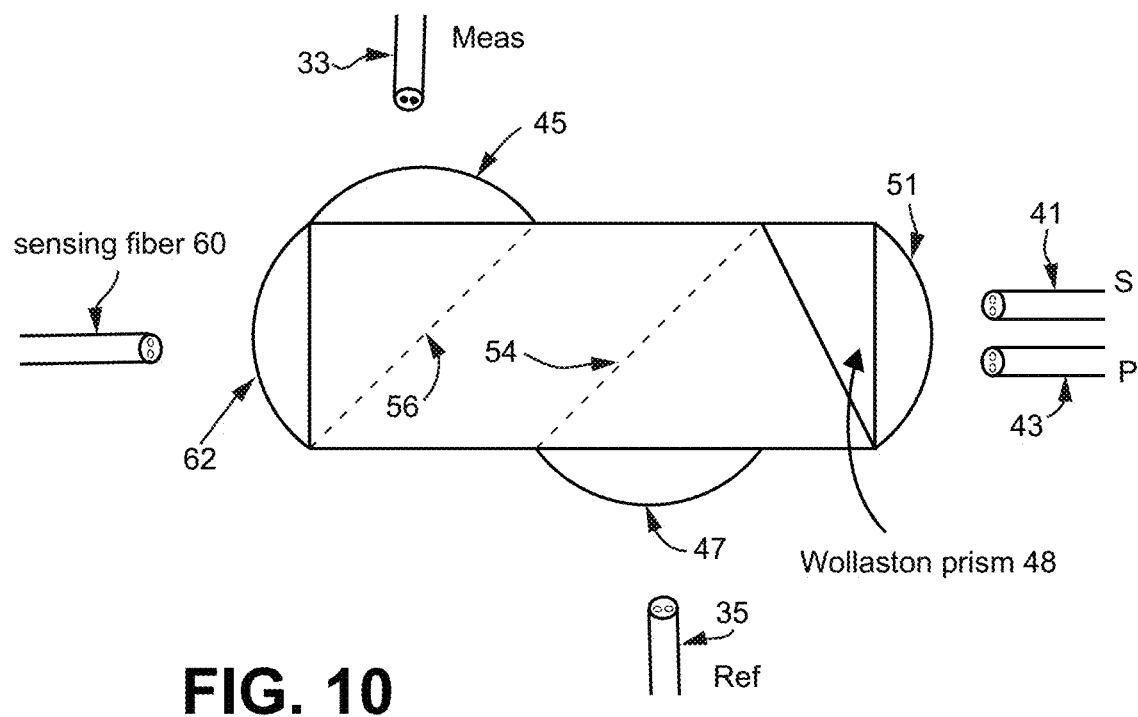
FIG. 10 shows an example optical assembly that replaces the example discrete optical components including the fanout portion of the system shown in FIG. 9 with a recombination network implemented with bulk optics.

FIG. 10 shows an example shared optical assembly that replaces the example discrete optical components including the fanout portion of the system shown in FIG. 9 (block 58) with a shared recombination network implemented with bulk optics. This single shared optic assembly is similar to that shown in FIG. 8 but includes a multicore sensing fiber 60 coupling to the assembly via plano-convex collimating lens 62 bonded to the splitters/prism and an additional partial (50/50) reflector 56 so that two partial (50/50) reflectors 54 and 56 are provided. The partial (50/50) reflector 56 couples the light from the multicore measurement fiber 33 to the sensing fiber 60, and the reflected light from the sensing fiber 60 is combined with the reference light from reference fiber 35 via the partial (50/50) reflector 54. The shared polarization beam splitting prism (e.g., a Wollaston prism 48 as shown in the Figures or some other suitable prism) separates the combined reflected light and reference light into the s polarized light detected by s detecting fiber 41 and second polarized light that is orthogonal to the first polarized light and detected by p detecting fiber 43.

In FIG. 10, all of the input and output fibers are multicore optical fibers. However, most fiber optic components in many applications are single core fibers. As a result, the inventors designed a further example embodiment where the focal length of the collimating lenses coupling the light into all of the ports of the assembly other than the sensing fiber port is increased. Increasing the focal length of these collimating lenses moves the image of the cores further apart which means that a bundle of standard single core (e.g., 80 micron) fibers can be used in place of the single multicore fiber.

Figure 11:
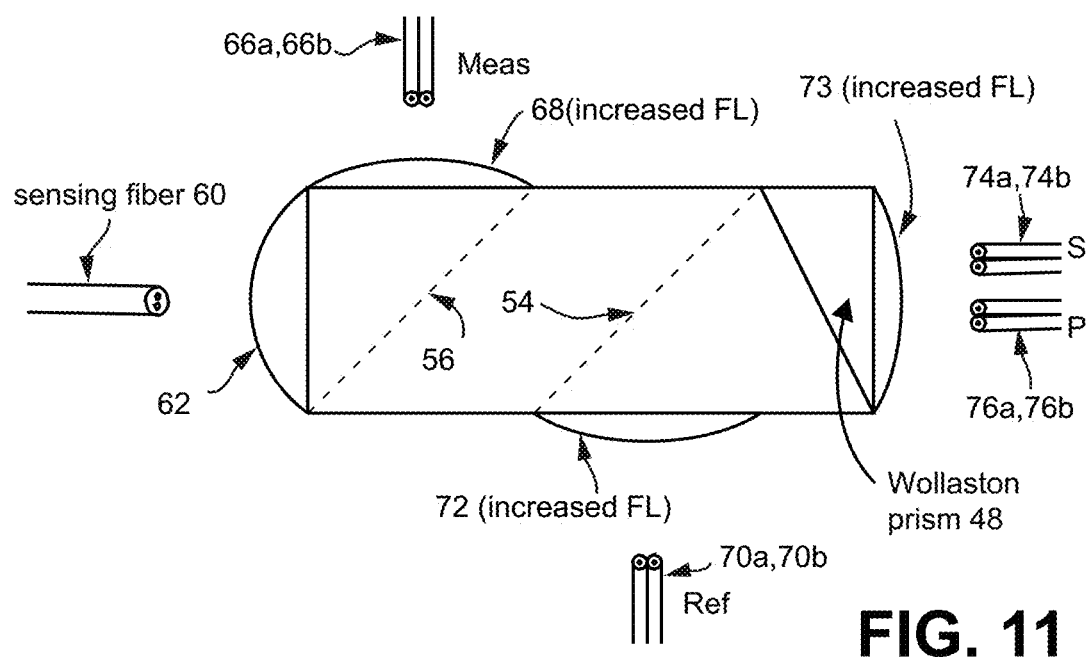
FIG. 11 shows an example optical assembly similar to that shown in FIG. 10 that connects multiple single-mode single-core optical fibers to a multicore sensing fiber.

FIG. 11 shows an example optical assembly similar to that shown in FIG. 10 that connects to a multicore sensing fiber 60 but that uses single core, single mode embodiments of measurement fibers 66a and 66b, single core, single mode embodiments of reference fibers 70a and 70b, single core, single mode embodiments of S detecting fibers 74a and 74b, and single core, single mode embodiments of P detecting fibers 76a and 76b. So even though the sensing fiber 60 is a single fiber with multiple cores, it is beneficial for the other input and output fibers to be single core fibers for cost reasons and so that splicing onto standard fiber-optic detectors or sources is available. Given the radius $r_c$ and numerical aperture NA of the sensing fiber 60, the spacing and numerical aperture of the single-mode, single core input and output fiber may be calculated using the following equation:

$$\frac{r_c}{D_{io}} = \frac{NA_{io}}{NA_{MC}}.$$

In this non-limiting example, 80 microns is selected as the diameter $D_{io}$ of the single core fiber because this is a standard fiber diameter:

$$\frac{35 \text{ μm}}{80 \text{ μm}} = \frac{NA_{io}}{0.2}.$$

Solving for the NA of the single core fiber gives a reasonable example number:

$$0.2 \frac{35 \text{ μm}}{80 \text{ μm}} = NA_{io} = 0.09.$$

A fiber having a Numerical Aperture of 0.09 is close enough to a commonly-used NA of 0.15 to permit splicing to common fibers without excessive loss. As a result, the multicore fibers in FIG. 10 are replaced in FIG. 11 with bundles of 80 micron single core fibers and with longer focal length lens collimators 68 and 72 and de-collimator 73.

One way of implementing each interferometer is to derive the multiple measurement and reference inputs from the power in a single fiber that is split using a 1×N coupler, where N is the number of cores in the multicore sensing fiber 60. But another way described in subsequent example embodiments implements 1×N couplers in the optical assembly using microlens arrays.

The optical assembly in FIG. 11 removes the need for multicore to single-core conversions, but the multiple connections needed for the reference light and the measurement light requires multiple splices, which are typically undesirable. Moreover, if there are multiple fiber inputs for the reference light, each of these inputs must have a polarization that couples roughly equally into the s and p output polarization ports. Example embodiments address this problem by allowing the light from a single-mode fiber to expand until it is the size of the multi-fiber bundle, and then using a micro lens array to create virtual cores by focusing the light to spots at the appropriate core locations.

Figure 12:
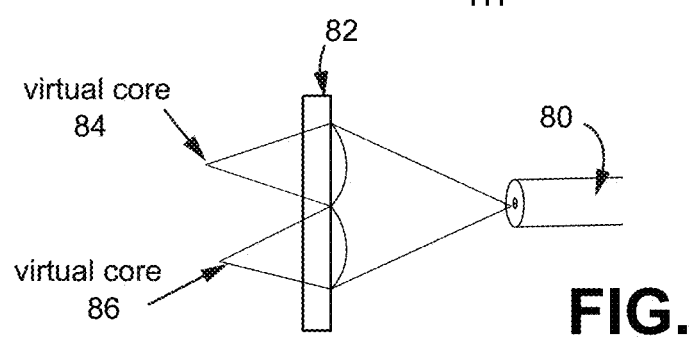
FIG. 12 illustrates an example microlens array of two lenses to create two virtual cores so that the two single core measurement fibers and the two single core reference fibers can each be replaced with a respective single core fiber.

FIG. 12 illustrates an example microlens array 82 of two lenses to create two virtual cores so that two single core measurement fibers and two single core reference fibers can each be replaced with one respective single core fiber. The microlens array 82 includes a set of nearly overlapping small lenses manufactured onto a single piece of glass or other appropriate substrate. The array allows a single beam to be coupled into multiple cores with minimal losses and is used to create multiple "virtual cores" from a beam emanating from a single core fiber. One of these single core measurement or reference fibers is indicated at 80, and two lenses on the array 82 are arranged so that they generate respective light beams as if they came from two "virtual" cores 84 and 86. In other words, light coming from two cores is emulated using one core and the two lenses in the array 82.

Figure 13:
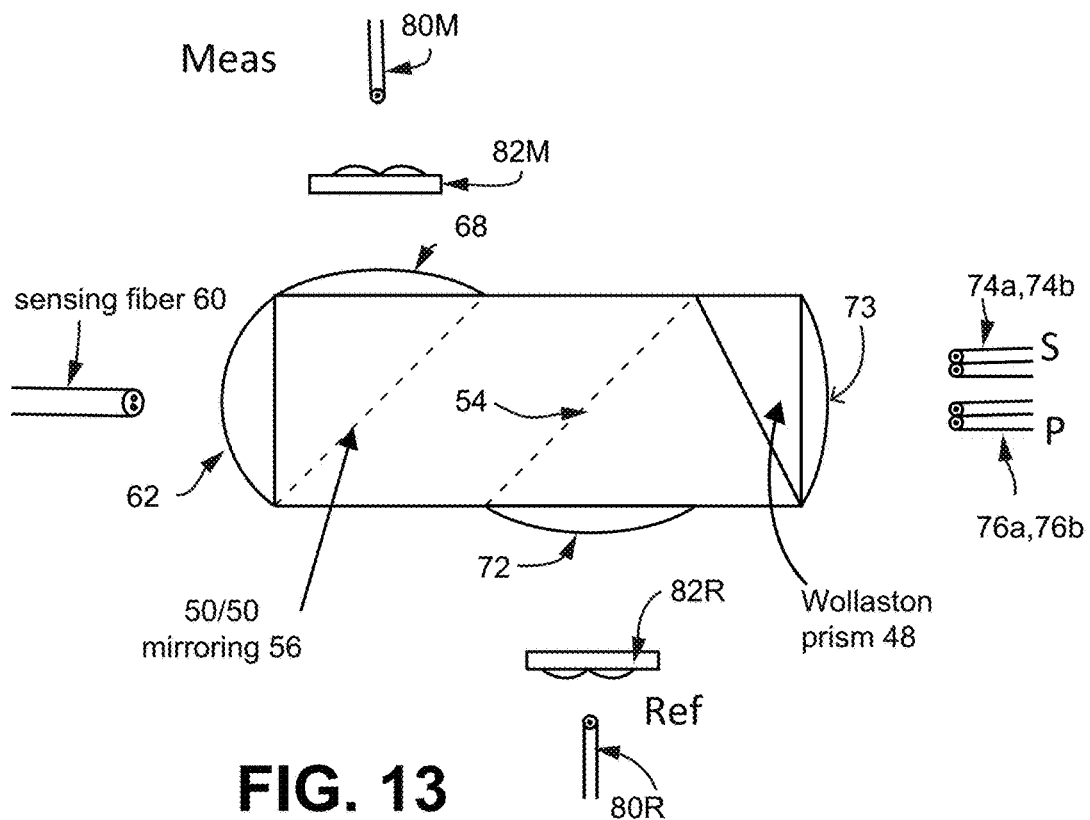
FIG. 13 shows the example optical assembly from FIG. 11 incorporating microlens arrays.

This example embodiment reduces the number of fibers, and therefore, reduces the size and cost of the fiber bundles at the measurement and reference inputs as shown in FIG. 13 with the example optical assembly from FIG. 11 incorporating microlens array 82M for the single core measurement fiber 80M and microlens array 82R for the single core reference fiber 80R.

Figure 14:
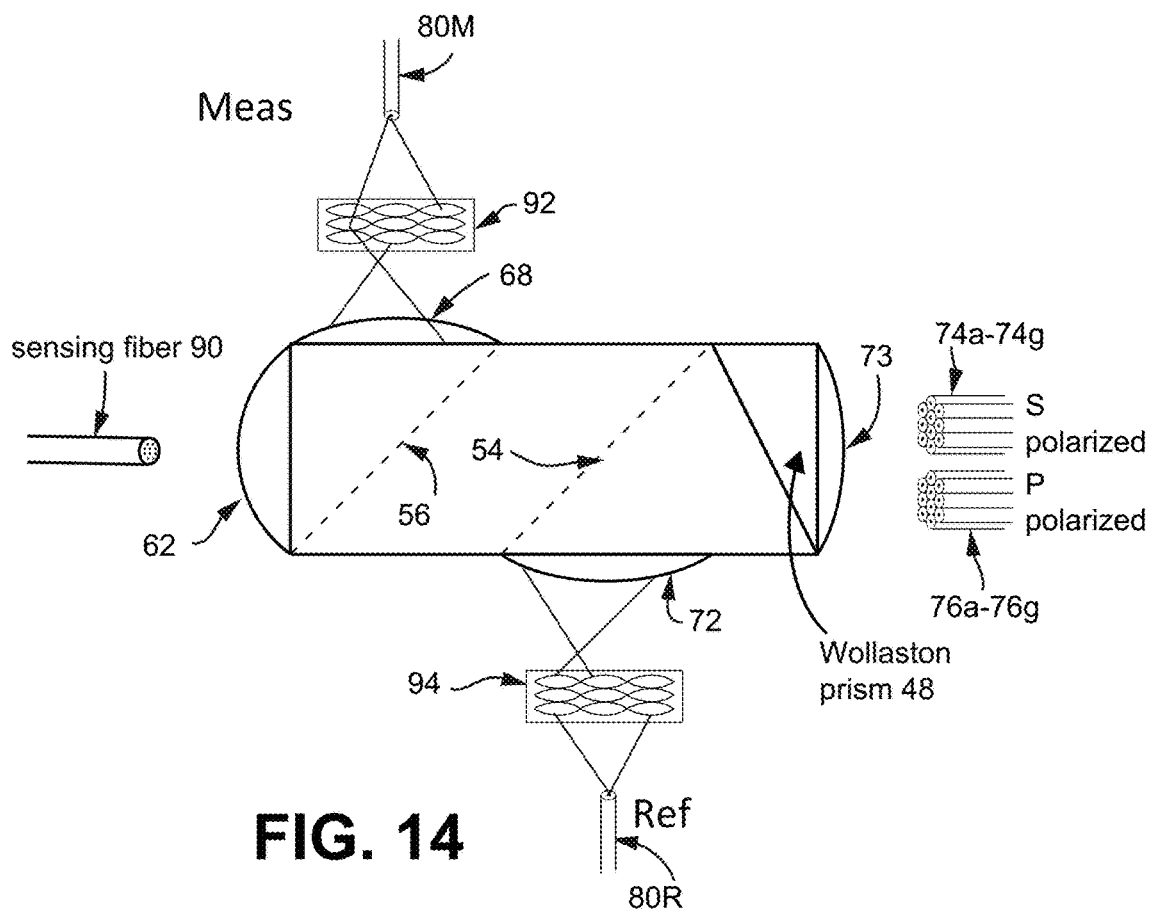
FIG. 14 shows an example optical assembly like that in FIG. 13 but for a seven core fiber sensor.

In many applications, more than two cores are required. FIG. 14 shows an example optical assembly like that in FIG. 13 but for a ten core fiber sensor. Here, a microlens array 92 with seven lenses generates light from seven virtual cores from the single core measurement fiber 80M, and a microlens array 94 with seven lenses generates light from seven virtual cores from the single core reference fiber 80R. The de-collimated outputs from the shared polarization beam splitting prism (e.g., a Wollaston prism 48 as shown in the Figures) separate the combined reflected light and reference light into s polarized light and p polarized light that is orthogonal to the s polarized light. The s polarized light is detected by a bundle of seven single core, single mode fibers 74a-74g, and the p polarized light is detected by a bundle of seven single core, single mode fibers 76a-76g.

Figure 15A:
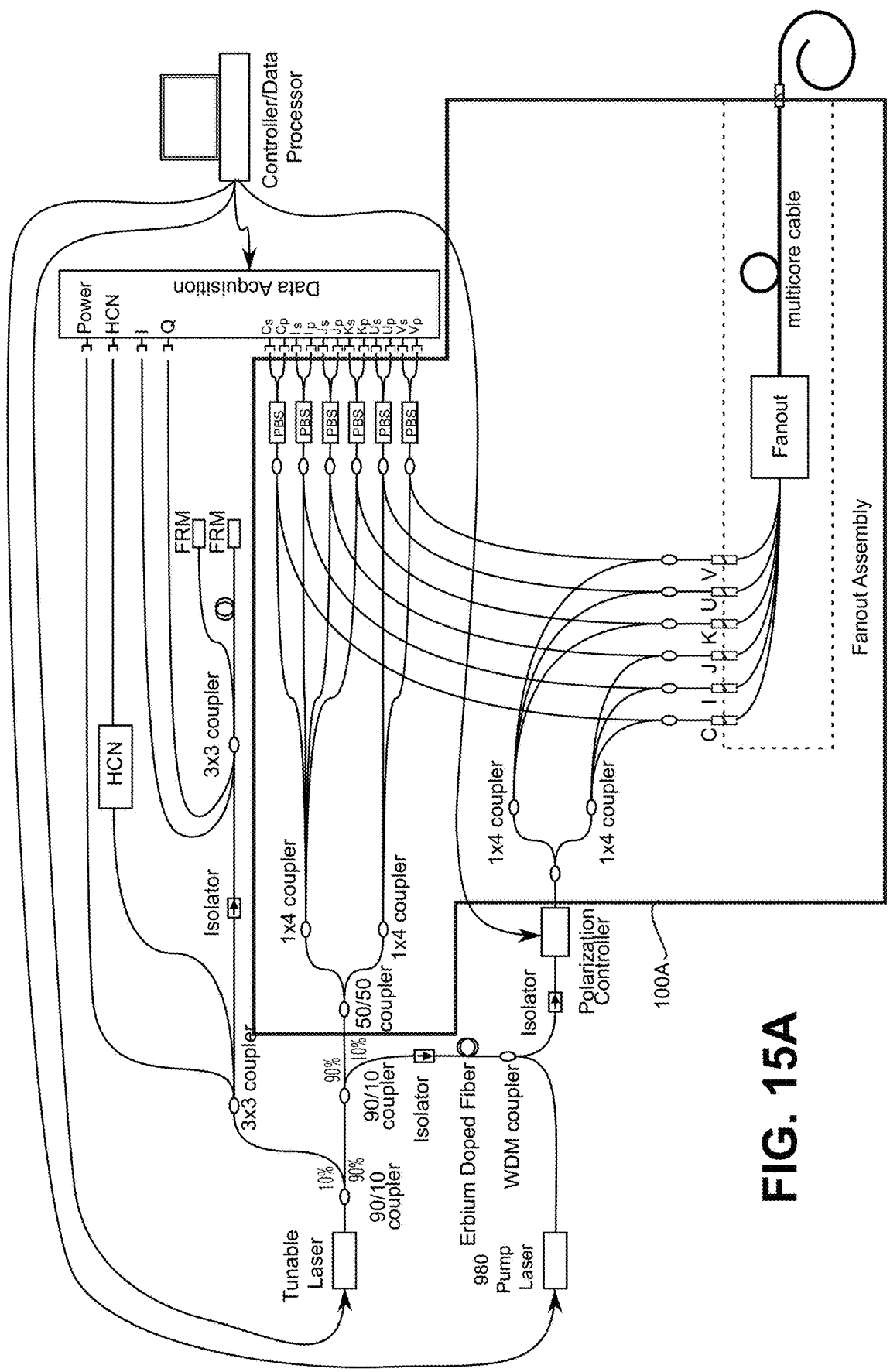
FIG. 15A shows a large number of discrete optical components in the example OFDR measurement system of FIG. 1 replaced in FIG. 15B with an example shared optical assembly.
Figure 15B:
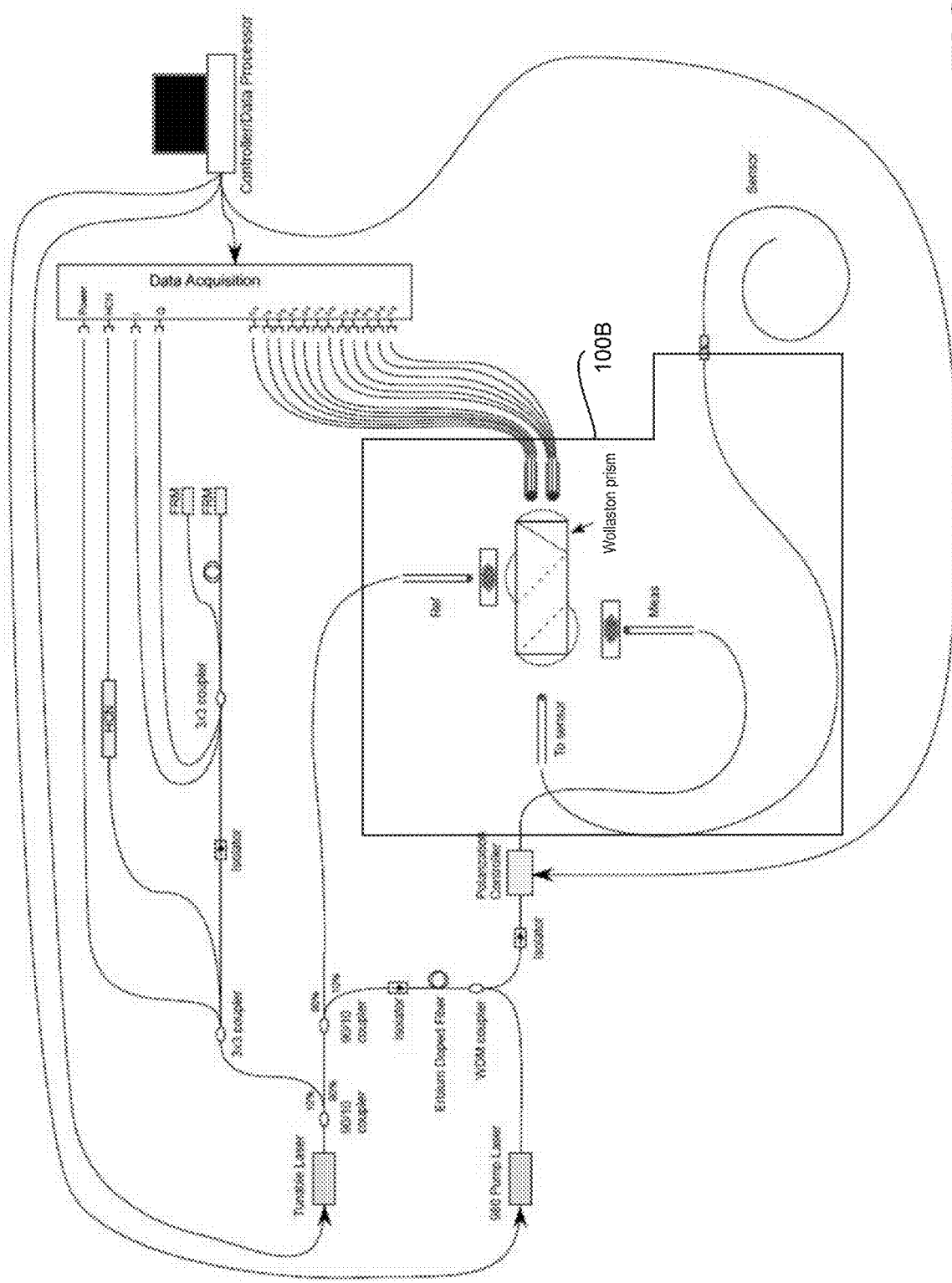

FIG. 15A shows a large number of discrete optical components in the example OFDR measurement system of FIG. 1 indicated at 100A replaced in FIG. 15B with an example shared optical assembly 100B. The 50/50 coupler and two 1×4 optical couplers in the upper left corner of 100A are replaced by the microlens array 94. The simplification, consolidation, space savings, and cost savings achieved by the example shared optical assembly are significant. Those skilled in the art will appreciate that an OFDR-based interrogation system similar to that shown in FIG. 15B may be used with a single mode, single core sensing fiber or with a sensing fiber with 2 cores, three cores, or some other number or cores that is more or fewer cores than 6 cores. For a single mode, single core sensing fiber embodiment, there is no need for the lens arrays, and only one S polarization detecting fiber and only one P polarization detecting fiber are needed.

Figure 16A:
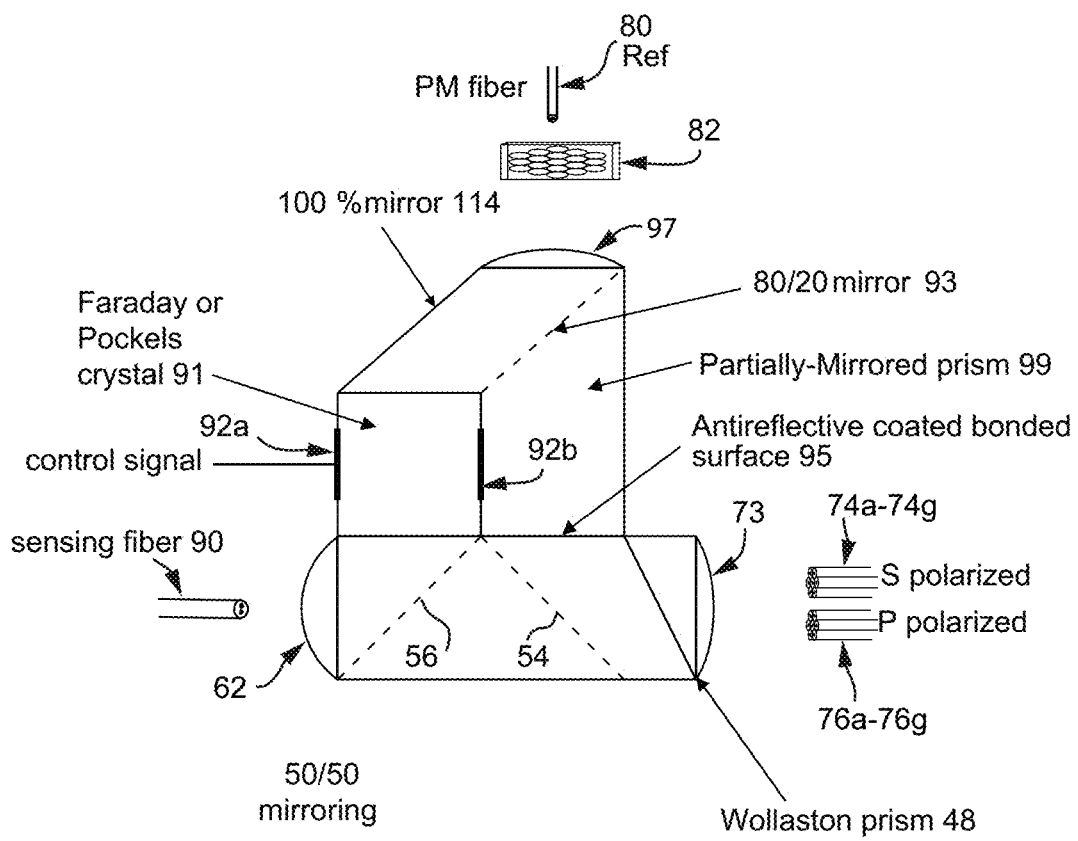
FIGS. 16A-16C show other example embodiments of a shared optical assembly using bulk optics for remote interferometry.
Figure 16B:
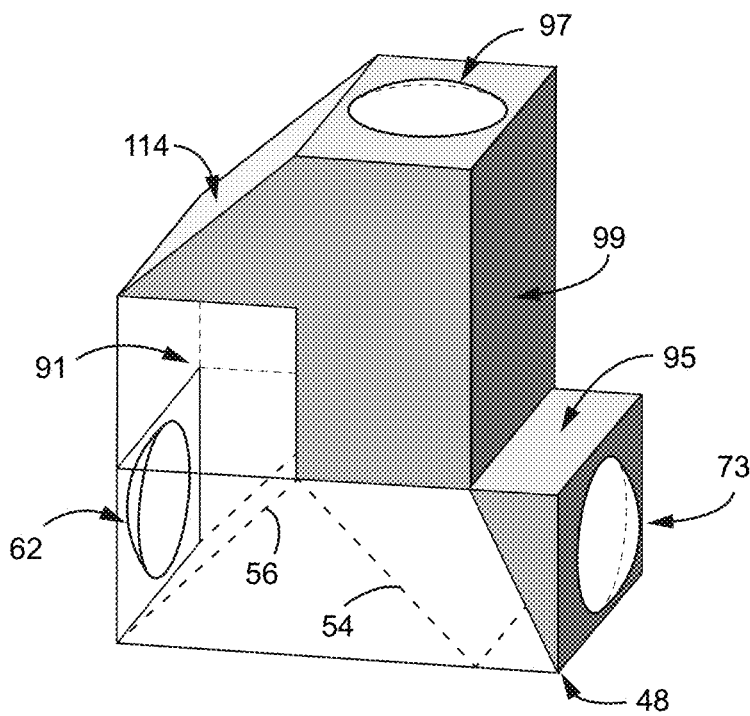
Figure 16C:
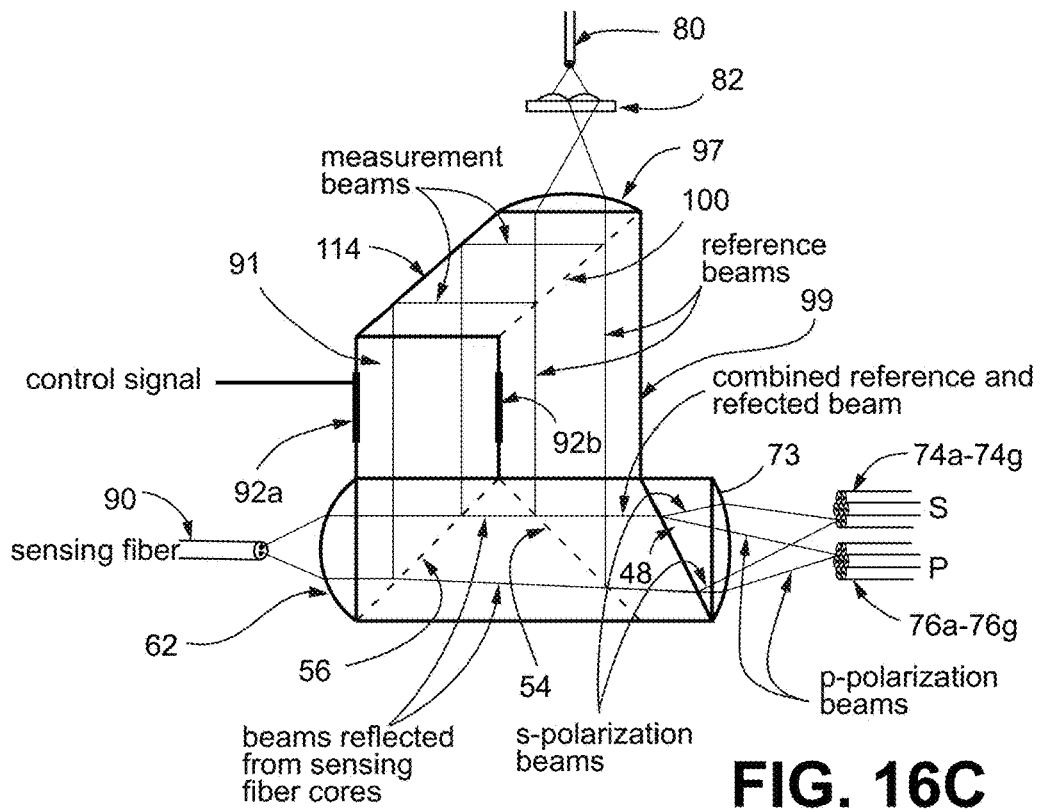

FIGS. 16A-16C show further example embodiments of a shared optical assembly using bulk optics for remote interferometry. There are advantages to incorporating significant delays in the reference signal, and these significant delays (e.g., tens of nanoseconds) often can only be implemented with lengths of optical fiber. This is why it is useful to provide separate fiber inputs for the measurement and reflection signals. On the other hand, it can also be useful to locate the interferometer close to the multicore fiber sensor. Locating the interferometer close to the multicore fiber sensor eliminates vibration errors in long lead-in fibers to the multicore fiber and can limit the number of connectors required in the system. The optical interferometer assembly shown in FIGS. 16A-16C uses a single input, polarization maintaining (PM) fiber 80 to generate both the reference and measurement inputs.

FIG. 16A shows a front two dimensional view of the optical interferometer assembly with individual elements labeled. FIG. 16B shows an exploded three dimensional view of the optical interferometer assembly. FIG. 16C shown a front two dimensional view of the optical interferometer assembly without individual elements labeled but with representative light beams shown and labeled.

In the case where the interferometry is located remotely, it is useful to generate a separate measurement and reference beam for each of the cores in the multicore fiber. Separate beams for each of the cores of the multicore fiber are generated by a microlens array 82 and are collimated with a collimating lens 97. Following the micro-lens array into an L-shaped, partially-mirrored prism 99, a partially reflecting (e.g., 80/20 percent) reflecting/transmitting surface 93 splits the each of the multiple beams for the multiple cores into a measurement set of beams and a reference set of beams as shown in FIG. 16C. The measurement light is then redirected down using a 100% mirror 114 and passes through a polarization modulating prism 91, e.g., a Faraday prism (a high current crystal) or a Pockels prism (a high voltage crystal), to modulate the polarization of the measurement light. The polarization modulation is controlled by a control signal (provided for example by the controller/data processor 22) actuating electrodes 92a, 92b.

Since the light came in from a polarization maintaining (PM) fiber, the polarization within the optical assembly is deterministic and insures that the axis of the polarization modulating prism 91 is aligned to the polarization of the light that is to be modulated. Similarly, the axis of the Wollaston prism 48 is chosen to be oriented a 45 degrees to the reference beam polarization in order to split the reference beam (which is linearly polarized) into two linearly polarized beams (S and P) with equal power.

Returning to the measurement beam propagation, after the polarization modulation via the activated electrodes 92a, 92b, the measurement beam is reflected off of the 50/50 reflector 56 and focused into a core of the sensing fiber 90. Light then reflects off of the Rayleigh scatter within the core or Bragg gratings written into the core of the sensing fiber 90, and this reflected light then exits the core of the sensing fiber 90 and retraces the path of the measurement light. The reflected light is re-collimated by the shorter focal length collimating lens 62. When the reflected light encounters the 50/50 reflector 56 that directed the measurement light into the core of the sensing fiber 90, half of the reflected light passes through the 50/50 reflector 56 to the 50/50 reflector 54. At this 50/50 reflector 54, the light reflected from the core of the sensing fiber 90 is combined with the reference light. The combined reference and reflected light of the sensing fiber is then split by the Wollaston prism 48 into the two component S and P polarization portions and focused into two separate single cores in the S and P detecting fiber bundles 74a-g and 76a-g.

As shown in FIG. 16C, the reference light passes from the partially-mirrored prism 99 into the prism below where it is combined with the light reflected from the sensing fiber 90 cores. The interface between these two prisms is preferably constructed to reduce or minimize reflections. One example way of minimizing these reflections is with an anti-reflective coating 95 on the interface surface. Another way would be to use an epoxy that is well-matched in refractive index to the glasses being used for the two prisms that are joined.

Those skilled in the art will appreciate that, although FIGS. 16A and 16C show a sensing fiber 90 with 2 cores, an optical assembly similar to that shown in FIGS. 16A-16C may be used with a single mode, single core sensing fiber or with a sensing fiber with any number of cores, such as more or less cores than 6 cores. For a single mode, single core sensing fiber embodiment, there is no need for the lens array 82, and only one S polarization detecting fiber 74a and one P polarization detecting fiber 76a are needed.

Detection of complementary interference signals is desirable for a shared optical assembly in order to form differential pairs of interference signals to cancel out noise and autocorrelation signals. In FIG. 16C, the beams reflected from the sensor cores are transmitted through the partial reflector 56 and combined with the reference beam reflected by the partial reflector 54. This combination of the transmitted sensor light beams and the reflected reference light beams continues to the right and is split into two polarization components by the Wollaston prism 48 and coupled into individual fiber cores of fibers 74a-74g and 76a-76g by the de-collimating lens 73.

Figure 17A:
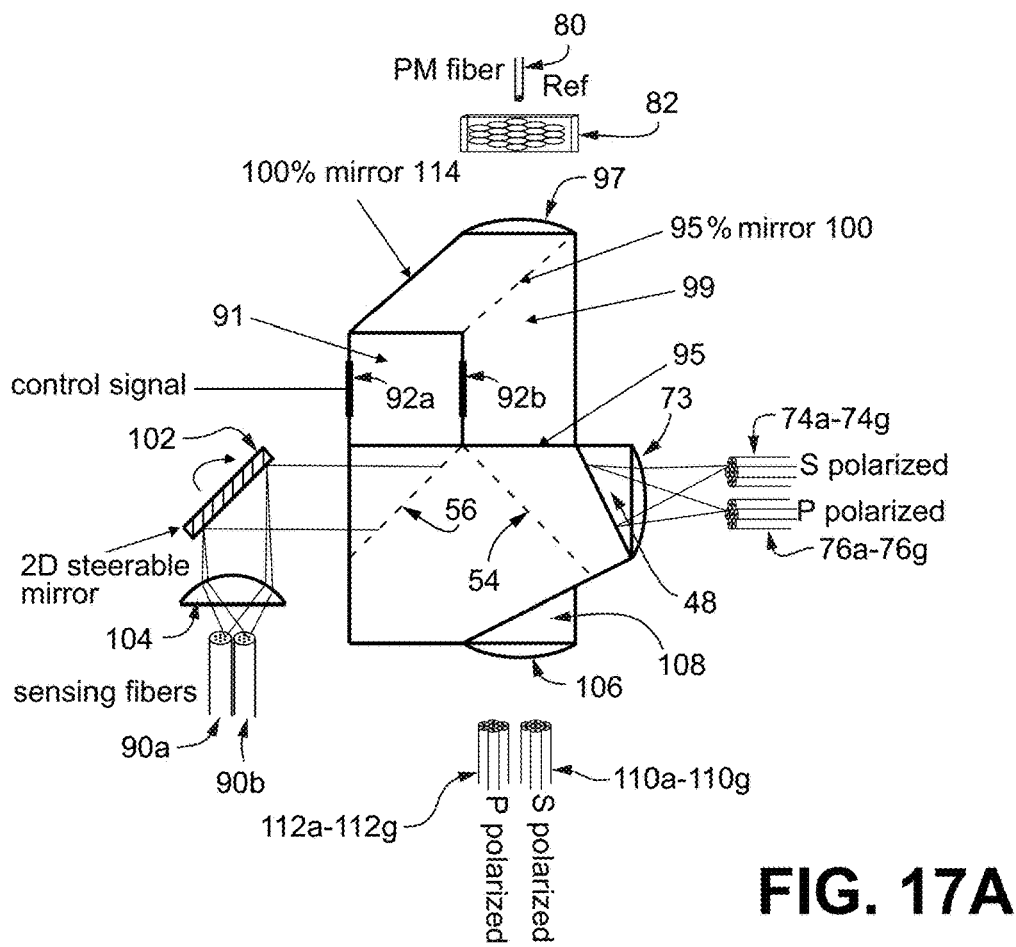
FIGS. 17A and 17B show an example shared optical assembly like that in FIGS. 16A-16C but for a seven core fiber sensor. Also shown is a beam steering mirror to allow for switching between sensors and additional S and P fiber bundles to allow for differential detection.
Figure 17B:
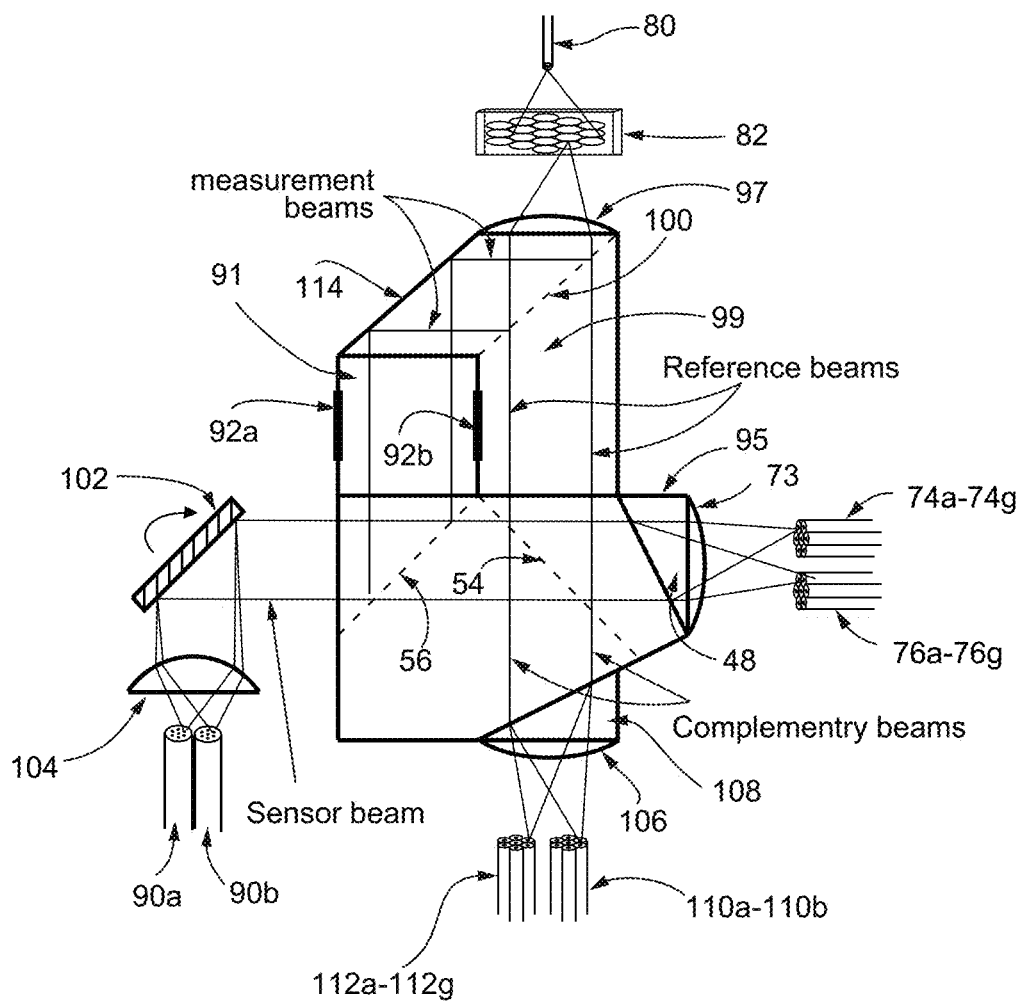

Another example embodiment that detects complementary interference signals is now described in conjunction with FIGS. 17A and 17B. In FIG. 17B, another complementary combination of the reference and sensor light beams is created by the combination of the transmitted reference light beam (heading down) and the reflected sensor light beam (also heading down). This second, complementary set of combined light beams is also split into its component polarizations by a Wollaston prism 108 labeled in FIG. 17A and coupled into sets of single-mode fibers 110a-110g and 112a-112g. This second, complementary set of combined light beams forms a set of complementary signals complementary to the primary signals captured by the fiber bundles on the right side of the assembly labeled as 74a-74g and 76a and 76g. Note that a complementary light beam from an interferometer has a characteristic that the interference is fully constructive on the primary output at 74a-74g and 76a-76g, and the interference is fully destructive on the complementary output captured by the fiber bundles on the bottom side of the assembly at 110a-110g and 112a-112g. Computing the difference between the primary output signal and the complementary output signal provides increased signal-to-noise ratio which means a better output signal.

Another example embodiment that detects complementary interference signals is now described in conjunction with FIGS. 17A and 17B. In FIG. 17B, another complementary combination of the reference and sensor light beams is created by the combination of the transmitted reference light beam (heading down) and the reflected sensor light beam (also heading down). This second, complementary set of combined light beams is also split into its component polarizations by a Wallaston prism 108 labeled in FIG. 17A and coupled into sets of single-mode fibers 110a-110g and 112a-112g. This second, complementary set of combined light beams forms a set of complementary signals complementary to the primary signals captured by the fiber bundles on the right side of the assembly labeled as 74a-74g and 76a and 76g. Note that a complementary light beam from an interferometer has a characteristic that the interference is fully constructive on the primary output at 74a-74g and 76a-76g, and the interference is fully destructive on the complementary output captured by the fiber bundles on the bottom side of the assembly at 110a-110g and 112a-112g. Computing the difference between the primary output signal and the complementary output signal provides increased signal-to-noise ratio which means a better output signal.

In some cases, it is also useful to be able to switch between different shape sensing fibers. This is particularly desirable in set-up mechanics where multiple devices are moved or adjusted individually and sequentially. In this case, each device can have an integrated sensor, but a single interrogator channel interrogates each sensor as that mechanical part is moved. Optical switches are expensive, and many switches may be needed if each switch controls a single optical core. Instead of using optical switches, another aspect of the example embodiment in FIGS. 17A and 17B (that may be used with or without the differential detection using the multiple sensors aspects just described) allows for inexpensive switching between multicore sensing fibers using a steerable mirror 102 to controllably adjust the location of the focused measurement beam through a de-collimating lens 104 to match the core locations in two sensing fibers 90a, 90b. The steerable mirror 102 may be controlled by a steering control signal (provided for example by the controller/data processor 22) to adjust the direction of the focused measurement beam. For example, by the controller/data processor 22 can generate a steering control signal that steers the steerable mirror 102 (such as by directing an actuator or other system to steer the mirror portion of the steerable mirror 102) to controllably adjust the location of a focus of the measurement beam between sensing fibers 90a, 90b. The controller/data processor 22 adjusts two currents or voltages to adjust the angle of the mirror 102. Only two multicore sensing fibers (also "sensor fibers") 90a, 90b are shown, but more may be added and "switched to" using the steerable mirror 102, e.g., by stacking the multicore sensing fibers in a triangular pattern, a square pattern, or any other compact arrangement. Control over the location of the focal points also means that small changes or errors in the translational position of a multicore sensing fiber can be compensated for by small adjustments in the mirror angle in various embodiments. For example, a control signal from the controller/data processor 22 may be configured for making small changes.

Those skilled in the art will appreciate that an optical assembly similar to that shown in FIGS. 17A-17B may be used with a single mode, single core sensing fiber or with a sensing fiber with more or fewer cores than 6 cores. A single mode, single core sensing fiber embodiment may be implemented without the lens array 82, and with only one S polarization detecting fiber 74a, one P polarization detecting fiber 76a, only one S polarization detecting fiber 110a, and one P polarization detecting fiber 112a.

The shared optical assemblies described in the example embodiments above have many advantages including reduced size, reduced number of moving parts, simplified operation, reduced cost especially in as the number of cores in the multicore sensing fiber increases over two cores, and increased reliability because of fewer parts that can be isolated in a smaller volume.

The technology described above also has wide and diverse applications. One non-limiting example application is to a fiber optic shape sensing system for a robotic surgical arm in which one or more of the various technical features and/or embodiments described above may be used.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke 35 USC § 112(f) unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. An optical system comprising:
    a reference fiber configured to deliver reference light;
    a measurement fiber configured to deliver modulated light the modulated light being modulated with respect to the reference light; and
    a bulk optics component comprising:
        a beam splitter to combine sensed light from a sensing fiber and the reference, light into combined light, the sensed light comprising at least some of the modulated light that is received by the sensing fiber and reflected from locations along a length of the sensing fiber; and
        a polarization beam splitting prism to separate the combined light into first polarized light and second polarized light that have orthogonal polarization states.

2. The optical system of claim 1, further comprising:
    one or more first polarized light detecting fibers to detect the first polarized light, wherein the polarization beam splitting prism directs the first polarized light to the one or more first polarized light detecting fibers; and
    one or more second polarized light detecting fibers to detect the second polarized light, wherein the polarization beam splitting prism directs the second polarized light to the one or more second polarized light detecting fibers.

3. The optical system of claim 1, wherein the sensing fiber comprises a multicore fiber.

4. The optical system of claim 3, wherein at least one of the beam splitter and the polarization beam splitting prism is shared by multiple cores of the multicore fiber.

5. The optical system of claim 1, wherein the bulk optics component further comprises:
    a first collimating lens to collimate the sensed light;
    a second collimating lens to collimate the modulated light;
    a third collimating lens to collimate the reference light; and
    a de-collimator to de-collimate the first and second polarized light.

6. The optical system of claim 5, wherein:
    the first collimating lens has a first focal length, the second collimating lens has a second focal length, the third collimating lens has a third focal length; and
    at least one of the second and third focal lengths is greater than the first focal length.

7. The optical system of claim 1, wherein the bulk optics component further comprises:
    a partial reflector for coupling light from the measurement fiber to the sensing fiber.

8. The optical system of claim 7, wherein the bulk optics component further comprises:
    a collimating lens for coupling light from the sensing fiber.

9. The optical system of claim 1, further comprising a lens array disposed between the bulk optics component and the measurement fiber, wherein the measurement fiber is a single mode, single core measurement fiber, and wherein each lens of the lens array operates to focus light from the measurement fiber to a corresponding core in the sensing fiber.

10. The optical system of claim 1, further comprising a lens array disposed between the bulk optics component and the reference fiber, wherein the reference fiber is a single mode, single core reference fiber; and wherein each lens of the lens array operates to focus light from the reference fiber to combine with light from a corresponding core in the sensing fiber.

11. The optical system of claim 1, wherein the optical system is an optical measurement system for measuring the sensing fiber; wherein the sensing fiber comprises multiple cores, and wherein the optical system further comprises:
   a tunable laser configured to provide swept laser light over a first measurement range of wavelengths, the reference fiber configured to receive a first portion of the swept laser light to form the reference light;
   a polarization controller configured to modulate a second portion of the swept laser light to form the modulated light;
   one or more first polarized light detecting fibers for detecting the first polarized light, wherein the polarization beam splitting prism directs the first polarized light to the one or more first polarized light detecting fibers;
   one or more second polarized light detecting fibers for detecting the second polarized light, wherein the polarization beam splitting prism directs the second polarized light to the one or more second polarized light detecting fibers; and
   detection circuitry to convert the first polarized light directed to the one or more first polarized light detecting fibers and the second polarized light directed to the one or more second polarized light detecting fibers into corresponding electrical signals.

12. An optical assembly for an optical interrogation system configured to operate with an optical sensing fiber, the optical assembly comprising:
   an input fiber; and
   a bulk optics component comprising:
      a first beam splitter to divide light from the input fiber into a measurement light beam and a reference light beam;
      a polarization modulator to produce a modulated measurement beam by modulating a polarization of the measurement light beam;
      a second beam splitter to couple a portion of the modulated measurement beam into the optical sensing fiber;
      a third beam splitter to combine light from the optical sensing fiber with the reference light beam into combined light; and
      a polarization beam splitting prism to separate the combined light into first polarized light and second polarized light that have orthogonal polarization states.

13. The optical assembly of claim 12, wherein the optical sensing fiber comprises multiple optical cores.

14. The optical assembly of claim 12, wherein the input fiber is a polarization maintaining input fiber; and wherein the bulk optics component further comprises:
   a lens array to transform light from the polarization maintaining input fiber into light from multiple virtual sources; and
   a first collimating lens to direct the light from multiple virtual sources to the first beam splitter.

15. The optical assembly of claim 14, wherein the first beam sp part of a partially-mirrored prism.

16. The optical assembly of claim 15, wherein the partially-mirrored prism includes a reflector for reflecting the measurement light beam from the first beam splitter into the polarization modulator.

17. The optical assembly of claim 12, wherein the polarization modulator includes a polarization modulating prism and associated electrodes, and wherein the associated electrodes, when activated by a control signal, modulate the polarization of the measurement light beam.

18. The optical assembly of claim 17, wherein the bulk optics component further comprises a first collimating lens to direct light from the input fiber to the first beam splitter, wherein the second beam splitter reflects a portion of the modulated measurement beam into the optical sensing fiber, wherein light reflected from the optical sensing fiber is recollimated by a second collimating lens having a shorter focal length than the first collimating lens, and wherein a portion of the light re-collimated by the second collimating lens is directed by the third beam splitter to the polarization beam splitting prism.

19. The optical assembly of claim 12, further comprising:
   a plurality of first polarized light detecting fibers for detecting the first polarized light; and
   a plurality of second polarized light detecting fibers for detecting the second polarized light, wherein the polarization modulator comprises a Faraday Crystal or a Pockels Crystal.

20. An optical assembly for an optical sensing system configured to operate with at least a first optical sensing fiber and a second optical sensing fiber, the optical assembly comprising:
   an input fiber;
   a first beam splitter to divide light from the input fiber into a measurement beam and a reference beam;
   a polarization modulator to produce a modulated measurement beam by modulating a polarization of the measurement beam;
   a steerable mirror to controllably steer a portion of the modulated measurement beam to a selected sensing fiber, the selected sensing fiber selected from the group consisting of:
      the first optical sensing fiber and the second optical sensing fiber;
   a second beam splitter to split light from the selected sensing fiber;
   a third beam splitter to provide combined light, the combined light combining the reference beam with the light split by the second beam splitter from the selected sensing fiber; and
   a first polarization beam splitting prism to separate the combined light into first polarized light and second polarized light that have orthogonal polarization states.

21. The optical assembly of claim 20, wherein the optical assembly is configured to:
   receive a control signal; and
   based on that control signal, steer the steerable mirror to adjust a location of a focus of the measurement beam or to adjust for changes or errors in a position of the selected sensing fiber.

22. The optical assembly of claim 20, wherein the polarization modulator comprises a Faraday Crystal or a Pockels Crystal.

23. An optical assembly for an optical interrogation system configured to operate with at least a first optical sensing fiber and a second optical sensing fiber, the optical assembly comprising:
   an input fiber;
   a first beam splitter to divide light from the input fiber into a measurement beam and a reference beam;
   a polarization modulator to produce a modulated measurement beam by modulating a polarization of the measurement beam;
   a second beam splitter to couple a portion of the modulated measurement beam into the first optical sensing fiber or the second optical sensing fiber;

a third beam splitter to provide combined light, the combined light combining the reference beam with light reflected from the first optical sensing fiber or the second optical sensing fiber; and a first polarization beam splitting prism and a second polarization beam splitting prism to separate the combined light into first polarized light and second polarized light that have orthogonal polarization states, wherein the first polarization beam splitting prism separates combined light associated with the first optical sensing fiber and the second polarization beam splitting prism separates the combined light associated with the second optical sensing fiber.

24. The optical assembly of claim 23, further comprising a first plurality of light detecting fibers for detecting the first polarized light associated with the first polarization beam splitting prism; a second plurality of light detecting fibers for detecting the second polarized light associated with the first polarization beam splitting prism, a third plurality of light detecting fibers for detecting the first polarized light associated with the second polarization beam splitting prism, and a fourth plurality of polarized light detecting fibers for detecting the second polarized light associated with the second polarization beam splitting prism.

25. The optical assembly of claim 24, wherein the first and second pluralities alight detecting fibers are configured to receive primary output signals associated with the first and second optical sensing fibers, and wherein the third and fourth pluralities of light detecting fibers are configured to receive complementary, differential output signals associated with the first and second optical sensing fibers, and wherein the optical assembly is configured to use a difference between the primary output signals and the complementary, differential output signals to provide increased output signal-to-noise ratio.

26. The optical assembly of claim 24, wherein the polarization modulator comprises a Faraday Crystal or a Pockels Crystal, wherein the first optical sensing fiber is a multicore sensing fiber, and wherein the second optical sensing fiber is a multicore sensing fiber.

* * * * *

UNITED STATES PATENT AND TRADEMARK OFFICE
CERTIFICATE OF CORRECTION

PATENT NO. : 10,976,155 B2
APPLICATION NO. : 16/333752
DATED : April 13, 2021
INVENTOR(S) : Froggatt et al.

Page 1 of 1

It is certified that error appears in the above-identified patent and that said Letters Patent is hereby corrected as shown below:

In the Claims

In Column 16, Line 4, in Claim 1, delete "light" and insert --light,-- therefor

In Column 16, Line 9, in Claim 1, delete "reference," and insert --reference-- therefor In Column 16, Line 64, in Claim 10, delete "fiber;" and insert --fiber,-- therefor In Column 17, Line 3, in Claim 11, delete "fiber;" and insert --fiber,-- therefor In Column 17, Line 50, in Claim 14, delete "fiber;" and insert --fiber,-- therefor In Column 17, Line 58, in Claim 15, delete "sp" and insert --splitter is-- therefor In Column 19, Line 17, in Claim 24, delete "prism;" and insert --prism,-- therefor In Column 20, Line 5, in Claim 25, delete "alight" and insert --of light-- therefor Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*